(12) United States Patent
Yabuta et al.

(10) Patent No.: US 7,898,602 B2
(45) Date of Patent: Mar. 1, 2011

(54) DISPLAY APPARATUS

(75) Inventors: Koji Yabuta, Kashiba (JP); Hiroshi Fukushima, Yamatokoriyama (JP); Tomoo Takatani, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 686 days.

(21) Appl. No.: 11/910,889

(22) PCT Filed: Mar. 24, 2006

(86) PCT No.: PCT/JP2006/305936
§ 371 (c)(1),
(2), (4) Date: Oct. 5, 2007

(87) PCT Pub. No.: WO2006/109513
PCT Pub. Date: Oct. 19, 2006

(65) Prior Publication Data
US 2009/0015732 A1      Jan. 15, 2009

(30) Foreign Application Priority Data
Apr. 8, 2005   (JP) .................................. 2005-112889

(51) Int. Cl.
*G02F 1/13* (2006.01)
(52) U.S. Cl. ............................................. 349/1; 349/15
(58) Field of Classification Search .................... None
See application file for complete search history.

(56) References Cited

U.S. PATENT DOCUMENTS

| 4,490,015 | A | * | 12/1984 | Kawarada et al. | ............ 349/130 |
| 5,883,739 | A | * | 3/1999 | Ashihara et al. | ............. 359/462 |
| 6,049,424 | A | * | 4/2000 | Hamagishi | .................... 359/464 |
| 6,445,434 | B2 | | 9/2002 | Takato et al. | |

FOREIGN PATENT DOCUMENTS

| GB | 2405516 A | 3/2005 |
| GB | 2405517 A | 3/2005 |
| GB | 2405518 A | 3/2005 |
| JP | 2005-321449 A | 11/2005 |

OTHER PUBLICATIONS

Official communication issued in the counterpart International Application No. PCT/JP2006/305936, mailed on May 2, 2006.

* cited by examiner

*Primary Examiner* — David Nelms
*Assistant Examiner* — Lucy P Chien
(74) *Attorney, Agent, or Firm* — Keating & Bennett, LLP

(57) ABSTRACT

On the display surface side of a DV display apparatus which performs image separation via a parallax barrier, a normally-white TN liquid crystal section is arranged such that a viewing angle direction heads toward the passenger seat. In a case where display is performed for both the driver's seat and the passenger seat, a drive voltage of the TN liquid crystal section is switched off. In a case where display for the driver's seat is set to non-display and an image is displayed only for the passenger seat, a halftone voltage is applied as the drive voltage of the TN liquid crystal section. In the case where display for at least one display direction is set to non-display in a display apparatus which can display different images in plural display directions by using a common display screen, it is possible to prevent image light for other directions from leaking to the non-display direction.

6 Claims, 16 Drawing Sheets

FIG. 4
DISPLAY FOR DRIVER'S SEAT
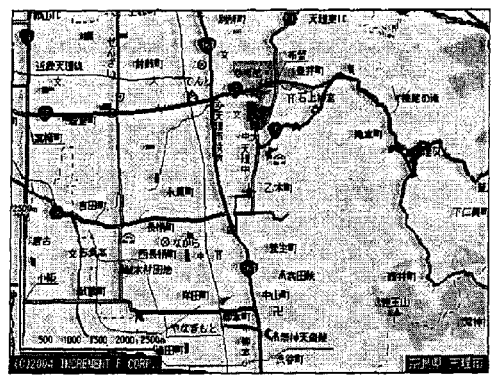
DISPLAY FOR PASSENGER SEAT
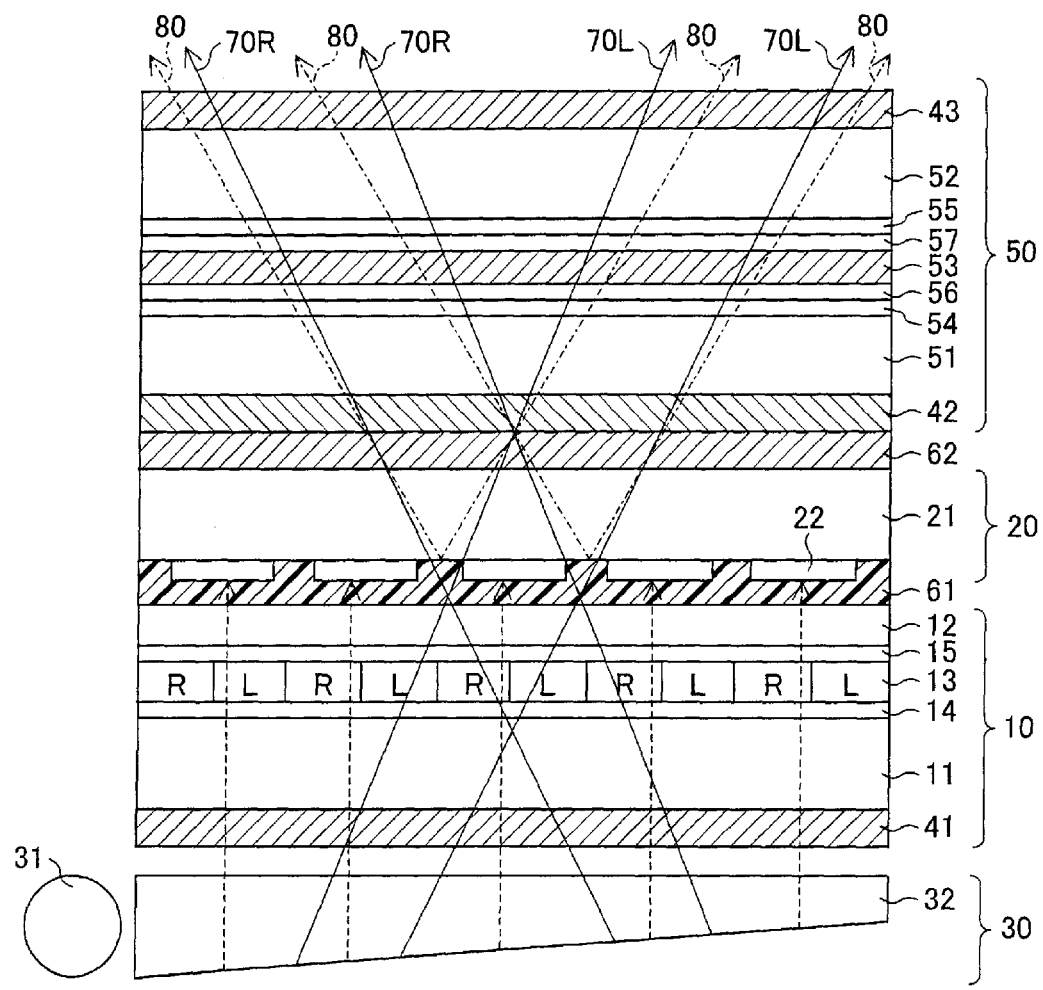

FIG. 5
DISPLAY FOR DRIVER'S SEAT
DISPLAY FOR PASSENGER SEAT
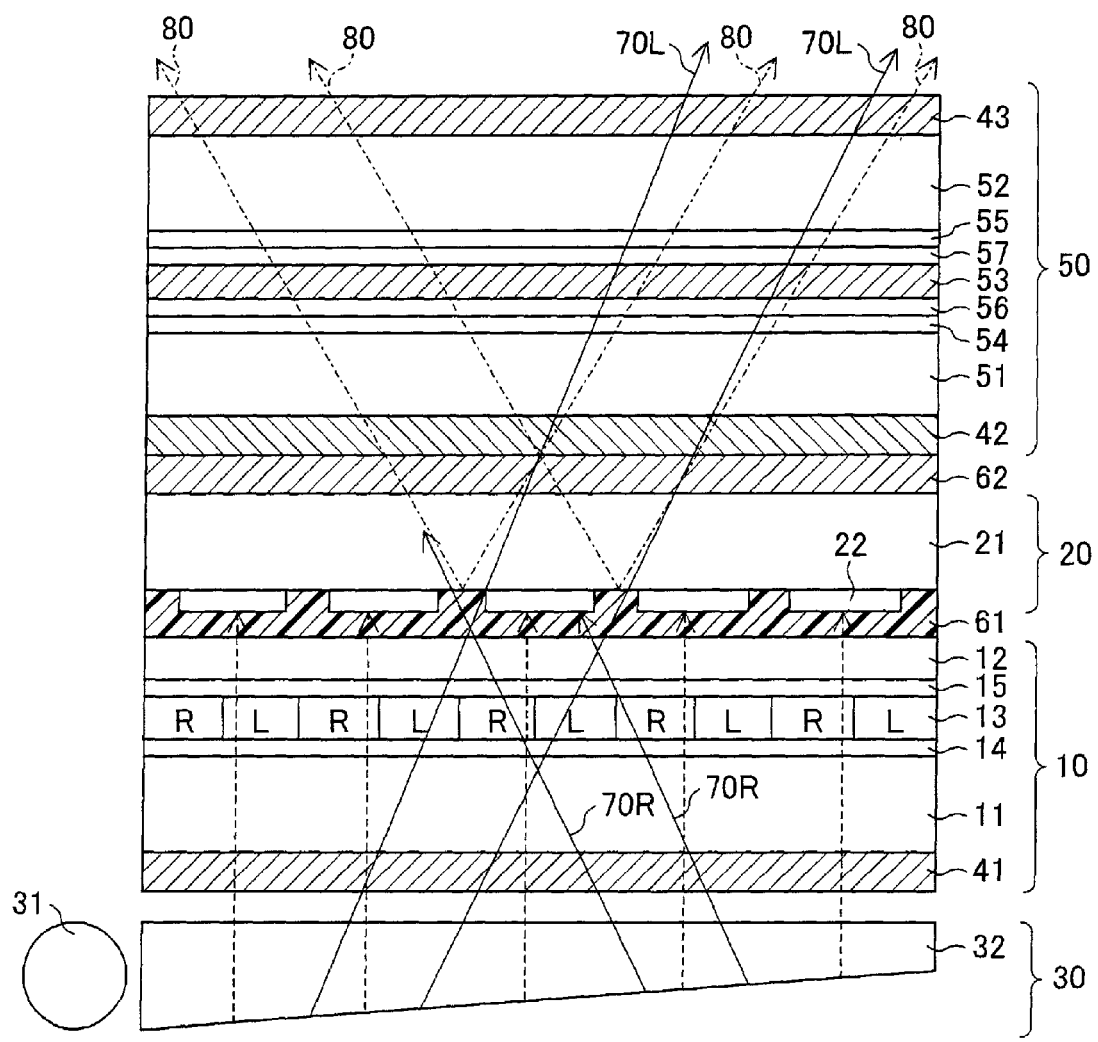

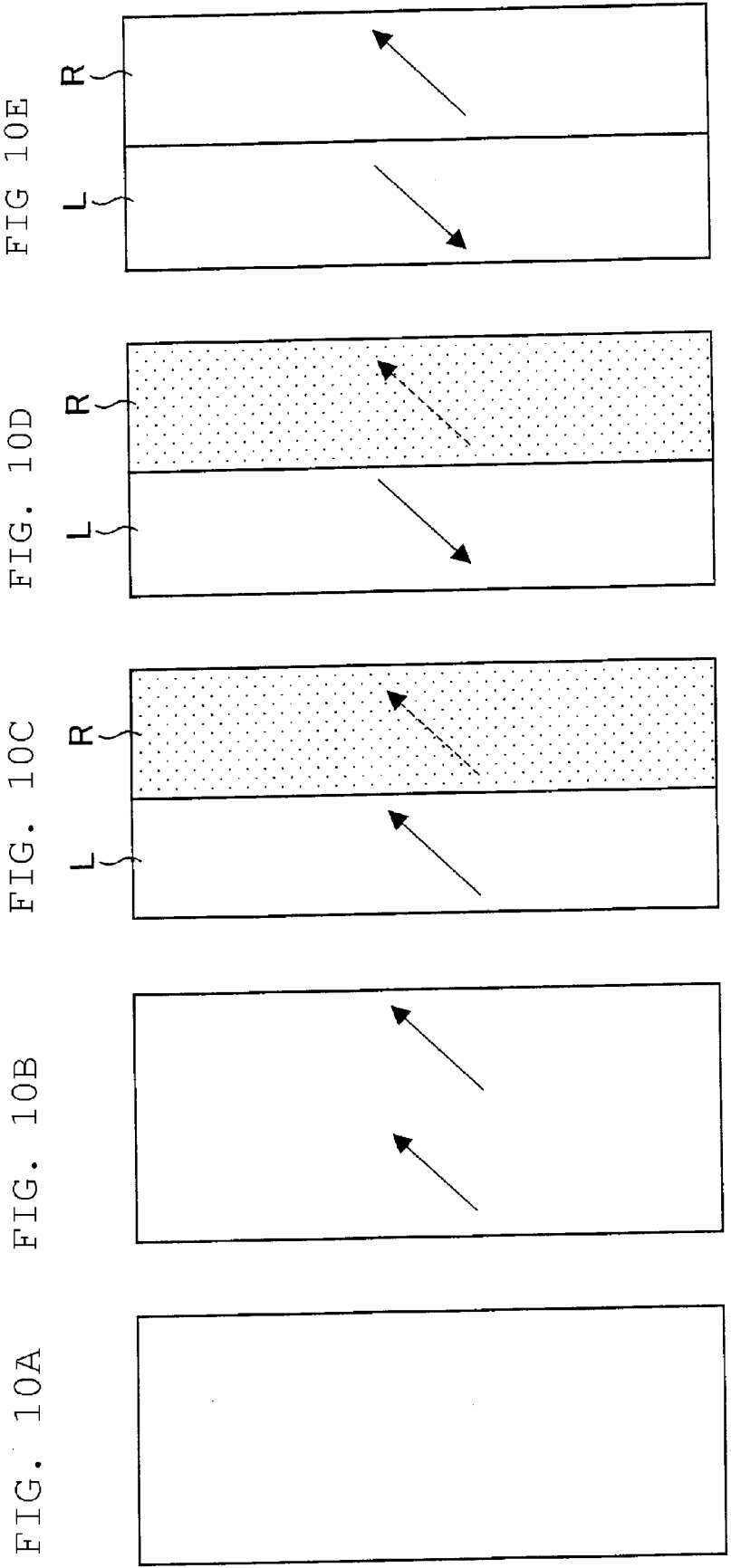

FIG. 11
DISPLAY FOR DRIVER'S SEAT
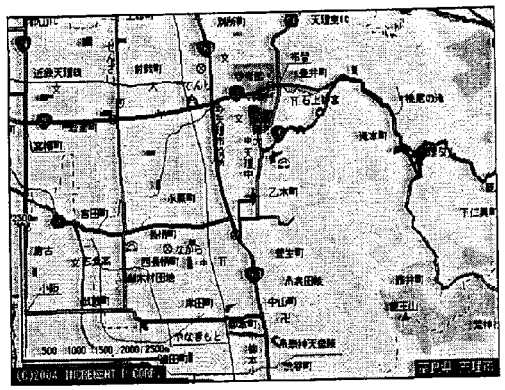
DISPLAY FOR PASSENGER SEAT
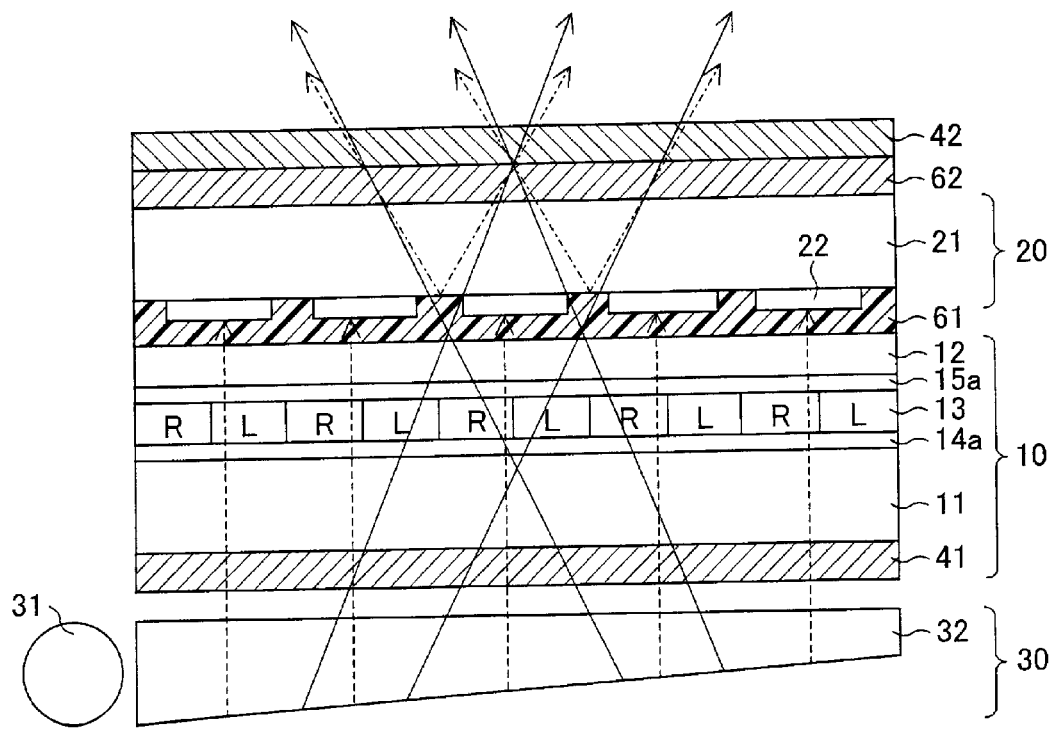

WITHOUT ORIENTATION DIVISION

WITH ORIENTATION DIVISION

FIG. 13
DISPLAY FOR DRIVER'S SEAT
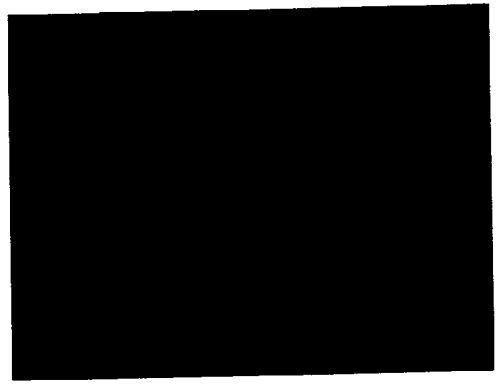
DISPLAY FOR PASSENGER SEAT
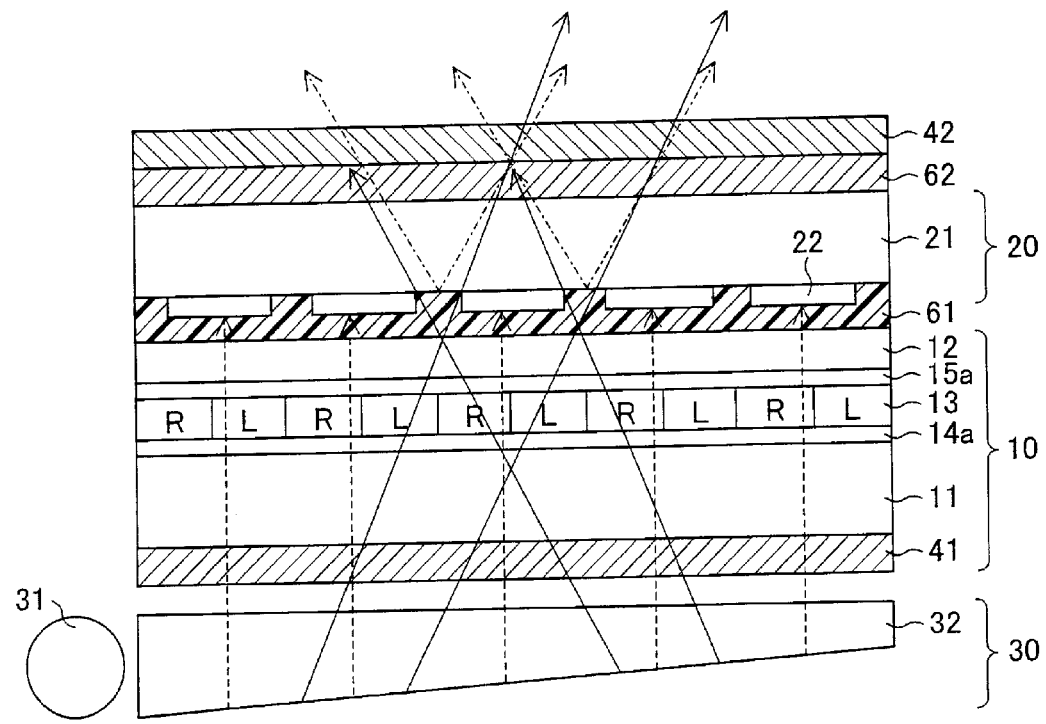

FIG. 15 - PRIOR ART
DISPLAY FOR DRIVER'S SEAT
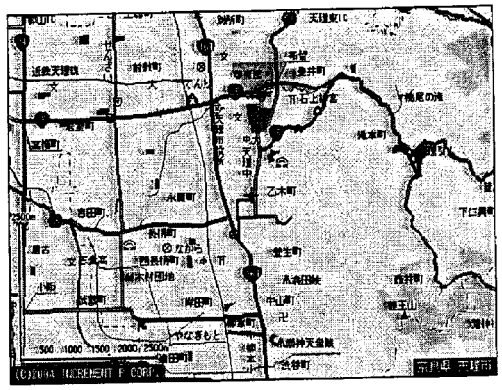
DISPLAY FOR PASSENGER SEAT
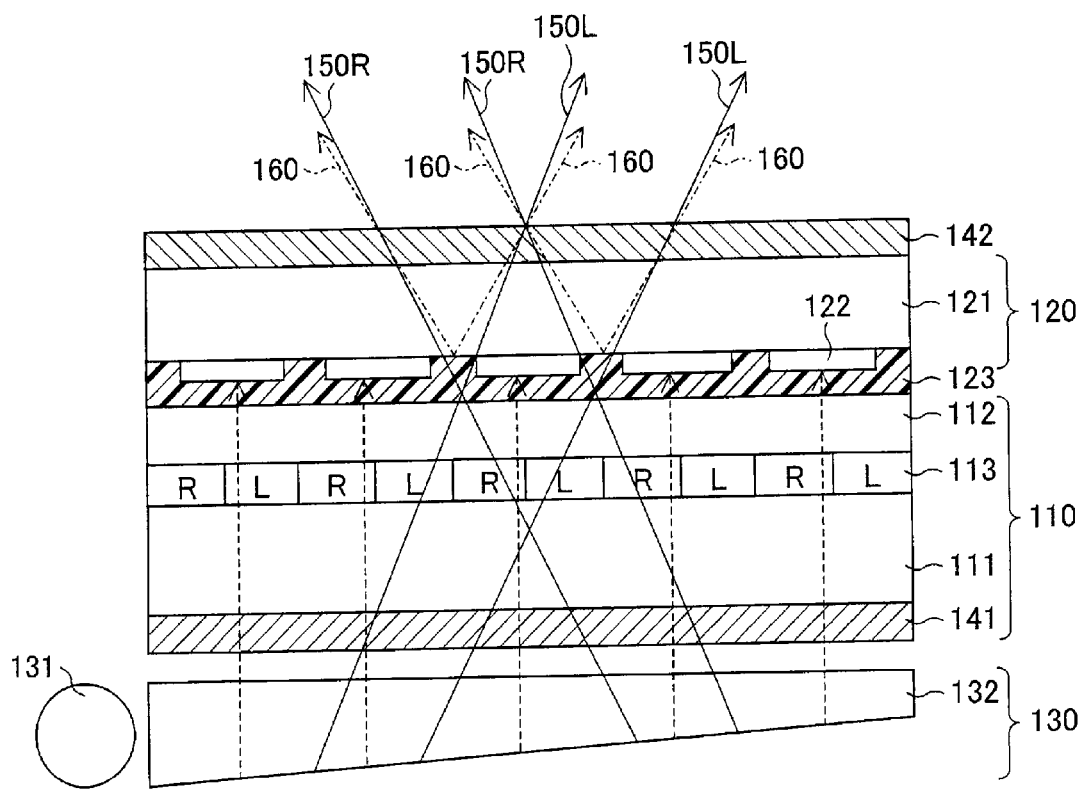

FIG. 16 - PRIOR ART
DISPLAY FOR DRIVER'S SEAT       DISPLAY FOR PASSENGER SEAT
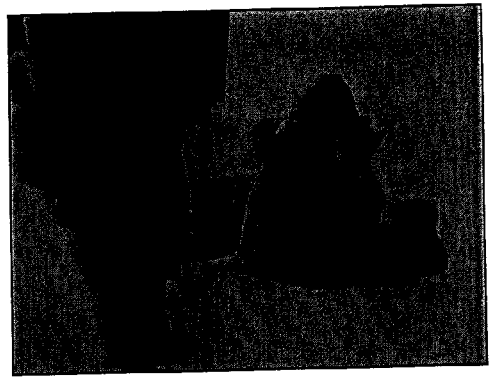
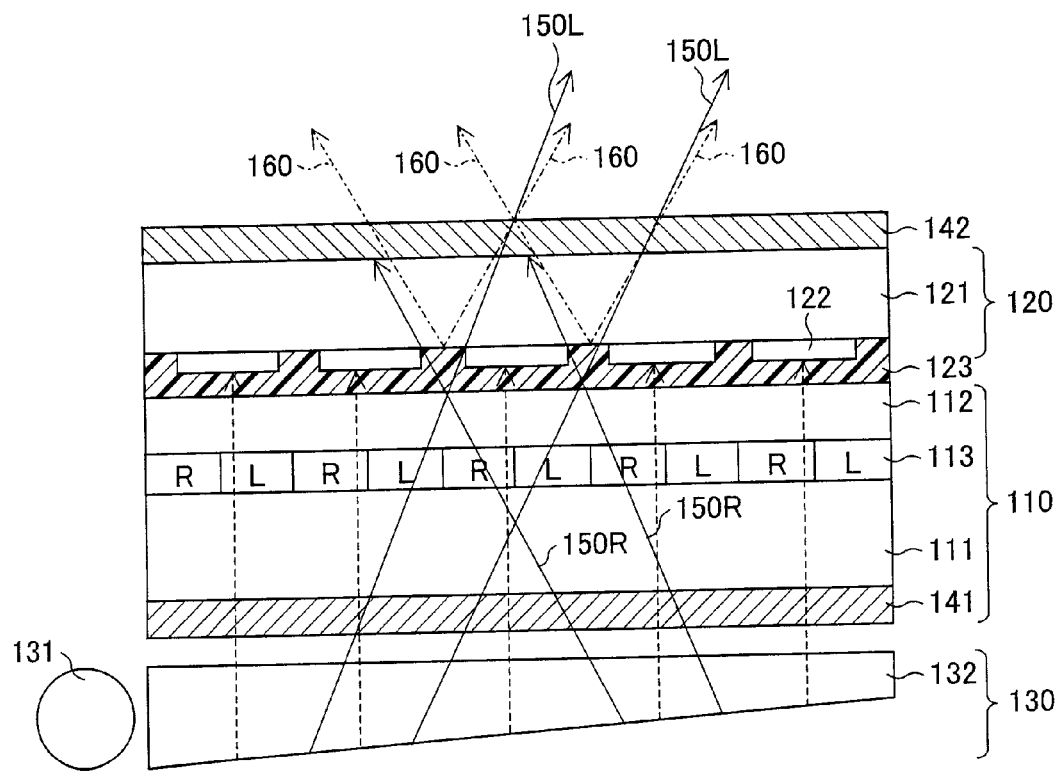

DISPLAY APPARATUS

BACKGROUND OF THE INVENTION

1. Field of the Invention

The present invention relates to a display apparatus displaying, on a common display screen, different images in respective directions.

2. Description of the Related Art

There have been proposed display apparatuses which can display, on a common display screen, different images in respective directions (i.e. DV (dual view) display).

FIG. 14 is a schematic cross section showing an example of such display apparatuses. The display apparatus shown in the figure includes a display panel 110, a barrier section 120, a backlight 130, and polarizing plates 141 and 142.

The backlight 130 is provided with a light source 131 and a reflection section 132 as shown in FIG. 14, and causes the display panel 110 to be irradiated with light in such a manner that the reflection section 132 reflects light emitted from the light source 131.

The display panel 110 is an active matrix liquid crystal display panel in which a liquid crystal layer 113 is sandwiched between a TFT substrate 111 and a CF substrate 112 opposing to each other.

The surface of the TFT substrate 111 is provided with plural data signal lines and plural scanning signal lines intersecting with the respective data signal lines. At each of the intersections between the data signal lines and scanning signal lines, a pixel is formed (none of these members are illustrated). The data signal lines and the scanning signal lines are connected to a source driver and a gate driver (none of them are illustrated), respectively. With this arrangement, a drive voltage is independently applied to each pixel so that alignment of liquid crystal molecules in each pixel area of the liquid crystal layer 113 is changed, and hence image display is achieved.

As shown in FIG. 14, the pixels are arranged in such a manner that, along the data signal lines, lines L of pixels for image display for the left side of the display apparatus and lines R of pixels for image display for the right side of the display apparatus are alternately provided.

The CF (Color Filter) substrate 112 has a color filter layer (not illustrated).

The TFT substrate 111 and the CF substrate 112 are provided with orientation films (not illustrated) on their surfaces opposing to each other. The orientation films are oriented in perpendicular directions, and each orientation film is rubbed in a direction parallel to the substrate surface. The polarizing plate 141 is provided on the backlight 130 side of the TFT substrate 111 in such a manner that the absorption axis direction of the polarizing plate 141 is parallel to the orientation of the orientation film on the TFT substrate 111. The polarizing plate 142 is provided on the display surface side of the barrier section 120 (i.e., on the opposite side to the backlight 130), in such a manner that the absorption axis of the polarizing plate 142 is perpendicular to the absorption axis of the polarizing plate 141. With this arrangement, a drive voltage applied to each pixel is changed so that each line of pixels can perform display for each display direction.

The barrier section 120 is constituted by a barrier glass 121, a barrier light shielding layer 122, and a resin layer 123. The barrier light shielding layer 122 shields against parts of light emitted from the backlight 130 and passing through the display panel 110. The resin layer 123 is formed on the barrier glass 121 so as to cover the barrier light shielding layer 122, and connects the barrier section 120 with the display panel 110.

The barrier light shielding layer 122 is provided so as to form stripes corresponding to the respective lines of pixels. That is to say, the stripes of the barrier light shielding layer 122 are formed to shield against parts of light emitted from the backlight 130 and passing through the lines of pixels, in such a manner as (i) to cause the lines L of pixels for the left side to be observable from the left side of the display apparatus but not to be observable from the right side of the display apparatus, and (ii) to cause the lines R of pixels for the right side to be observable from the right side of the display apparatus but not to be observable from the left side of the display apparatus. As a result, the display apparatus can display different images for the left and right sides of the display apparatus (i.e., can perform DV display).

In the meanwhile, for example, U.S. Pat. No. 5,883,739 discloses a vehicle information display apparatus in which left-viewpoint image and right-viewpoint image for the driver's seat and left-viewpoint image and right-viewpoint image for the passenger seat are alternately arranged by pixel and synthesized, so that a stereoscopic image is viewable from the driver's seat and the passenger seat.

This document also teaches that, the left-viewpoint and right-viewpoint images for the driver's seat are made blank and synthesized with the left-viewpoint and right-viewpoint images for the passenger seat, with the result that a stereoscopic image cannot be viewed from the driver's seat and only viewable from the passenger seat.

U.S. Pat. No. 6,445,434 discloses a liquid crystal display apparatus including a liquid crystal layer, an orientation film by which the liquid crystal layer is oriented, and a drive circuit driving the liquid crystal layer, wherein the orientation film is divided into plural areas each of which has a visible size and a particular shape, and orientations of neighboring areas are different from one another.

In this liquid crystal display apparatus, a displayed content is hardly viewable in all directions except a case where the liquid crystal display apparatus is viewed head-on, on account of the arrangement above. Also, since a predetermined pattern is viewed in directions other than the head-on direction, a figure or a product name may be presented to the viewer.

U.S. Pat. No. 6,445,434 also teaches that two liquid crystal layers (upper liquid crystal layer and lower liquid crystal layer) are provided, and the lower liquid crystal layer which is farther away from the viewer is used for regular display whereas the upper liquid crystal layer is used for switching between a state where the display by the lower liquid crystal layer is viewable in directions other than the head-on direction and a state where the aforesaid display is not viewable in directions other than the head-on direction.

According to this technique, the upper liquid crystal layer has plural areas with different orientations, and the areas are provided so that neighboring areas have different orientations. The upper liquid crystal layer is used for displaying a predetermined figure when viewed in directions other than the head-on direction. With this arrangement, when the upper liquid crystal layer is in a halftone display state, an image displayed on the lower liquid crystal layer is viewable head-on, but, in directions other than the head-on direction, the image on the lower liquid crystal layer is blocked by the figure on the upper liquid crystal layer and hence hardly viewable. Also, after an electric field is applied to the upper liquid crystal layer so that liquid crystal molecules in the upper liquid crystal layer are upright, the image on the lower liquid crystal layer becomes viewable in directions other than the head-on direction.

In the technique of U.S. Pat. No. 6,445,434, however, only a predetermined pattern is viewable in directions other than the head-on direction, or at best, only either the same image as the head-on direction or a predetermined figure is viewable in directions other than the head-on direction. It is therefore impossible to display, by a shared display screen, different images (e.g., moving images) in plural directions.

As discussed above, U.S. Pat. No. 5,883,739 teaches that an image for the driver's seat is made blank when the vehicle is running, with the result that an image cannot be viewed from the driver's seat and is only viewable from the passenger seat.

However, in the display apparatus of U.S. Pat. No. 5,883,739, even if an image for the driver's seat is made blank, an image for the passenger seat may be viewable from the driver's seat, on account of crosstalk. Also in a case where an image for the driver's seat is set to non-display (black display) and only image display for the passenger seat is carried out in a conventional DV display apparatus shown in FIG. 14, the same problem occurs.

That is to say, in the display apparatus of U.S. Pat. No. 5,883,739 and FIG. 14, sets of image light for respective display directions are separated by a parallax barrier which is a conventionally-proposed image separation device. However, when black display for the driver's seat and image display for the passenger seat are performed by a parallax barrier, cross talk of the image for the passenger seat to the driver's seat tends to be obvious. It is therefore necessary to improve the separation capability.

Why such crosstalk occurs will be explained with reference to FIG. 15. FIG. 15 illustrates an example of a display state in which the conventional DV display apparatus shown in FIG. 14 is used as an in-vehicle display apparatus and different images are displayed for the driver's seat and the passenger seat, respectively.

As shown in FIG. 15, in the case where different images are displayed for the driver's seat (right side) and for the passenger seat (left side), among light 150R having passed through lines R of pixels for the right side, sets of light towards the driver's seat reach the driver's seat side through the gaps of the barrier light shielding layer 122, whereas sets of light towards the passenger seat are blocked by the barrier light shielding layer 122. On the other hand, among light 150L having passed through lines L of pixels for the left side, sets of light towards the passenger seat reach the passenger seat through the gaps of the barrier light shielding layer 122, whereas sets of light towards the driver's seat are blocked by the barrier light shielding layer 122. This theoretically makes it possible to separate images (image lights) displayed for the driver's seat and the passenger seat from one another.

In reality, however, scattered/diffracted light 160 is generated because of scatter and diffraction of light at the end surface of the barrier light shielding layer 122, multiple reflection at the layers of the display apparatus, and the like. The scattered/diffracted light 160 is emitted to the display directions so that crosstalk occurs and the separation capability of images is decreased. In other words, while the parallax barrier theoretically makes it possible to separate image lights towards the respective display directions from one another, crosstalk occurs in reality because of diffraction of light at the end surface of the barrier, multiplex reflection at the layers of the display, and the like.

Such crosstalk is relatively unrecognizable when images are displayed for the driver's seat and the passenger seat (i.e., when display for the driver's seat is not black display), but is easily recognizable when display for the driver's seat is black display, as an image for the passenger seat is vaguely leaked to the display for the driver's seat.

FIG. 16 illustrates a case where black display is provided to the driver's seat and an image is only provided to the passenger seat, using the DV display apparatus shown in FIG. 14.

As shown in the figure, in a case where display for the driver's seat is in non-display mode, light 150R having passed through the lines R of pixels for the right side is blocked and cannot pass through the polarizing plate 142. With this, display for the driver's seat is supposed to be non-display. In reality, however, scattered/diffracted light 160 is emitted to the driver's seat. As a result, the image for the passenger seat may be overlapped with the black display for the driver's seat, and a double image may be recognizable.

As such, an in-vehicle DV display apparatus may be required to perform, while the vehicle is running, black display for the driver's seat (i.e., non-display for the driver's seat) and display an image only for the passenger seat. In the conventional art, an image for the passenger seat may vaguely appear on the black display for the driver's seat, and a double image may be recognized from the driver's seat.

SUMMARY OF THE INVENTION

In order to overcome the problems described above, preferred embodiments of the present invention improve image separation capability in at least one display direction in a display apparatus which can display different images in plural display directions by using a common display screen, in a case where display for the at least one display direction is set to non-display. In short, preferred embodiments of the present invention prevent image light for other directions from leaking to the non-display direction.

A display apparatus according to a preferred embodiment of the present invention includes a display device in which plural pixels for displaying images in predetermined directions are disposed in a predetermined order in accordance with directions of displaying the images; and a light shielding member arranged to prevent light emitted from the pixels from being viewed in directions other than display directions of the pixels, the display apparatus displaying different images in plural display directions, respectively, the display apparatus further comprising a barrier liquid crystal panel which (i) lets the light emitted from the pixels and having passed through the light shielding member to pass through in the display directions, when a drive voltage is not applied, and (ii) decreases transmittance in a particular display direction, when the drive voltage is applied.

According to the arrangement above, light emitted from the barrier liquid crystal panel in the particular direction is reduced by applying a drive voltage to the barrier liquid crystal panel. As a result, in a case where display in the particular direction is set to non-display, it is possible to reduce a component of light due to scattering and diffraction at the light shielding member, the component traveling in the non-display direction. This makes it possible to prevent crosstalk which occurs in such a manner that image light in other display directions leaks to the non-display direction, and hence the image separation capability in the non-display direction is improved.

These and other features, elements, processes, steps, characteristics and advantages of the present invention will become more apparent from the following detailed description of preferred embodiments of the present invention with reference to the attached drawings.

BRIEF DESCRIPTION OF DRAWINGS

FIG. 4 illustrates display on the display apparatus of a preferred embodiment of the present invention, in a case where different images are displayed for the driver's seat and the passenger seat, respectively.

FIG. 5 illustrates display on the display apparatus of a preferred embodiment of the present invention, in a case where display for the driver's seat is set to non-display and an image is displayed only for the passenger seat.

FIGS. 10A-10E show a process of rubbing for the orientation film of the main liquid crystal display panel of the display apparatus of another preferred embodiment of the present invention.

FIG. 11 shows display on the display apparatus of another preferred embodiment of the present invention, in a case where different images are displayed for the driver's seat and the passenger seat, respectively.

FIG. 13 shows display on the display apparatus of another preferred embodiment of the present invention, in a case where display for the driver's seat is set to non-display and an image is displayed only for the passenger seat.

FIG. 15 shows display on the conventional DV display apparatus, in a case where different images are displayed for the driver's seat and the passenger seat, respectively.

FIG. 16 illustrates display on the conventional DV display apparatus, in a case where display for the driver's seat is set to non-display and an image is displayed only for the passenger seat.

DETAILED DESCRIPTION OF PREFERRED EMBODIMENTS

First Preferred Embodiment

Figure 1:
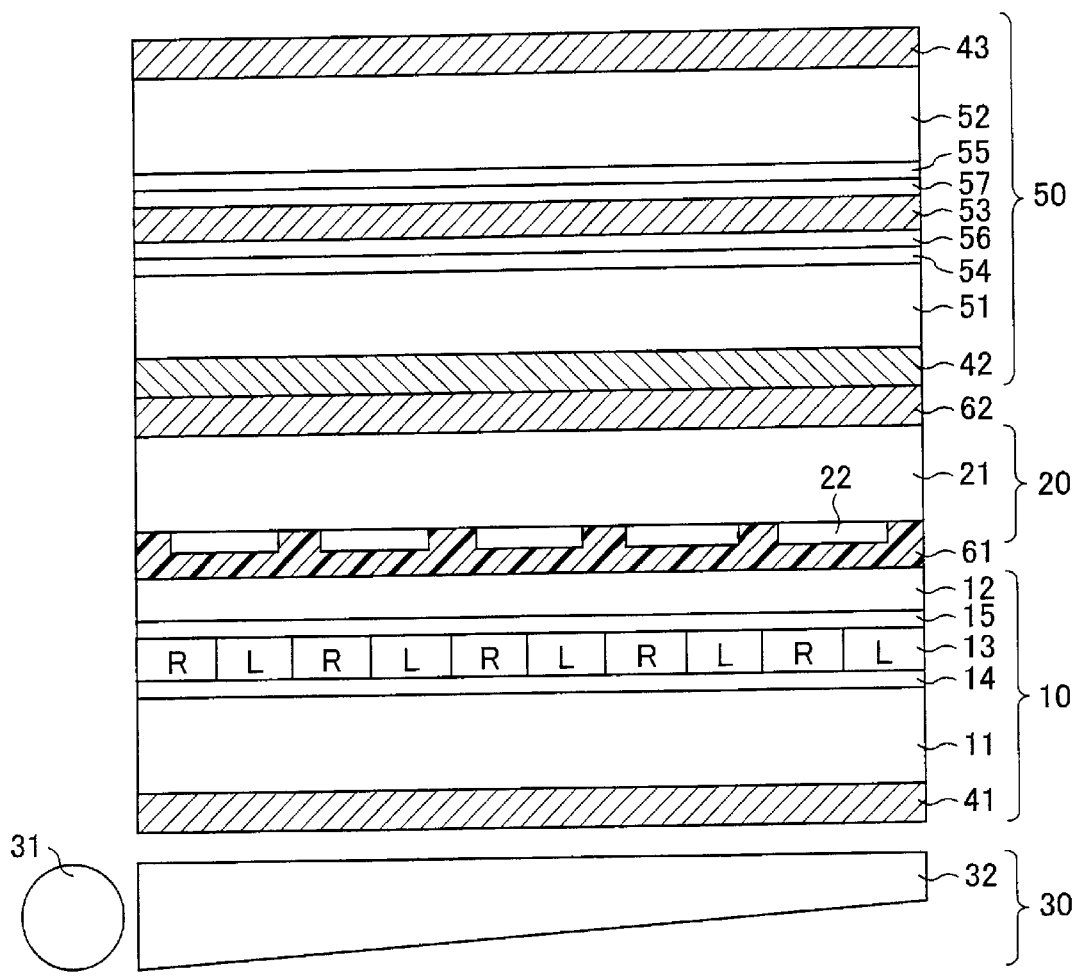
FIG. 1 is a schematic cross section outlining a display apparatus of a preferred embodiment of the present invention.

The following will describe a preferred embodiment of the present invention with reference to figures. FIG. 1 is a cross section outlining a display apparatus 1 which is a display apparatus of the present preferred embodiment.

Figure 2:
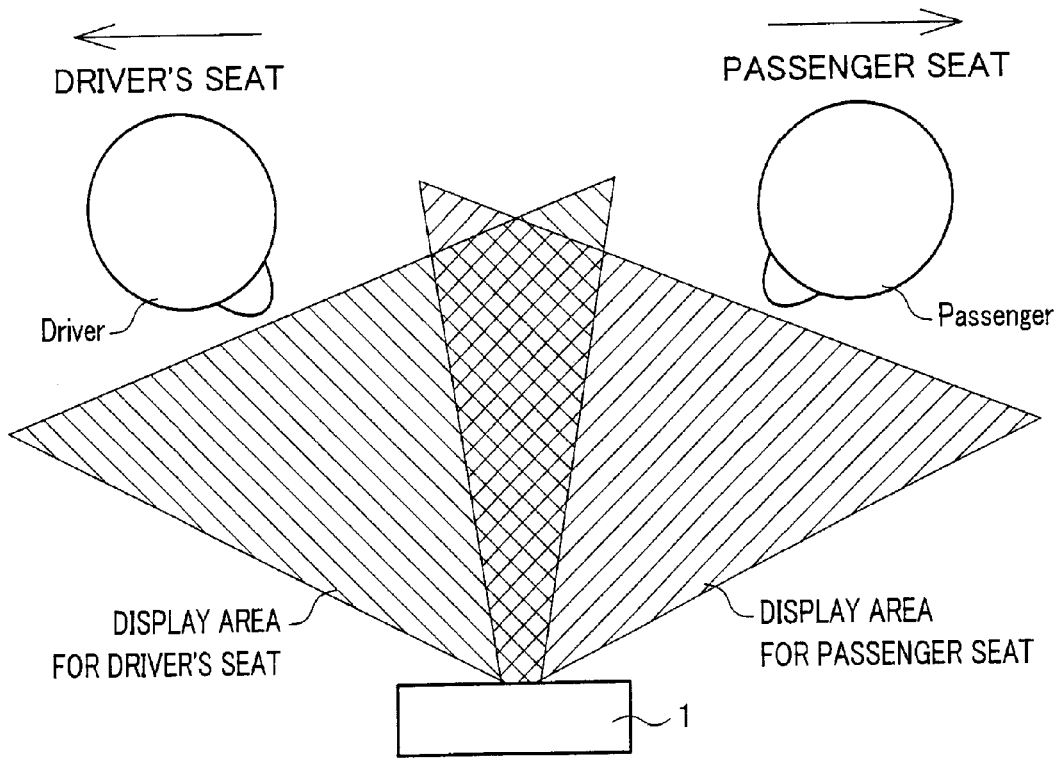
FIG. 2 schematically illustrates display on the display apparatus of a preferred embodiment of the present invention.

The display apparatus 1 is an in-vehicle display mounted to an automobile (vehicle). FIG. 2 schematically illustrates display on the display apparatus 1. As shown in the figure, the display apparatus 1 is capable of displaying (DV-displaying) different images for the driver's seat (to the driver's seat direction) and for the passenger seat (in another direction), respectively. In the display apparatus 1, while the vehicle is running, display for the driver's seat is set to non-display and hence display is performed only for the passenger seat. In this specification, "non-display" indicates that nothing is virtually displayed by, for example, wholly displaying black color.

As shown in FIG. 1, the display apparatus 1 includes a display panel (display device, main liquid crystal display panel) 1, a barrier section 20, a backlight 30, a TN liquid crystal section (barrier liquid crystal panel) 50, and adhesive layers 61 and 62.

The backlight 30 includes a light source 31 and a reflection section 32 as shown in FIG. 1. Light emitted from the light source 31 is reflected by the reflection section 32 so that the light irradiates the display panel 10. Examples of the light source 31 include LED (Light Emitting Diode), CCFT (Cold Cathode Fluorescent Tube), and CCFL (Cold Cathode Fluorescent Lump).

The display panel 10 preferably is an active matrix liquid crystal display panel in which a liquid crystal layer 13 made of nematic liquid crystal is sandwiched between a TFT substrate 11 and a CF substrate 12 which oppose one another.

On the TFT substrate 11, many data signal lines and many scanning signal lines intersecting with the respective data signal lines are provided. At each intersection of the data signal line and the scanning signal line, a pixel is provided (all of these members are not illustrated). The data signal lines are connected to a source driver 94 whereas the scanning signal lines are connected to a gate driver 95 (see FIG. 17 which will be dealt with below). The source driver 94 and the gate driver 95 generate drive voltages (signals, data) for causing each pixel to display an image corresponding to the display direction of the pixel. On the TFT substrate 11, furthermore, one of each pair of electrodes (second electrode) for applying an electric field to each pixel is provided. The other of each pair is provided on the CF substrate 12 (both electrodes are not illustrated). The electrode provided on the CF substrate 12 may be a common electrode for plural pixels.

On the opposing surfaces of the TFT substrate 11 and the CF substrate 12, orientation films 14 and 15 are provided, respectively. The orientations of the orientation films 14 and 15 are substantially perpendicular to each other. With these arrangements, a drive voltage is independently applied to each gap between the electrodes corresponding to each pixel, so that orientation of liquid crystal molecules in each pixel area of the liquid crystal layer 13 is changed and hence image display is achieved. In the display apparatus 1, the TFT substrate 11 preferably is about 700 μm thick, for example.

On the backlight 30 side of the TFT substrate 11, a polarizing plate 41 is provided.

On the CF (Color Filter) substrate 12, a color filter layer (not illustrated) is provided. The color filter layer is provided with R, G, and B sub-pixels for each pixel. The CF substrate 12 is thinned down by a mechanical process such as chemical etching and grinding to be about 50 μm thick, for example.

The pixels are provided in such a manner that a series of pixels for image display in one direction are provided along the data signal lines, so as to form a pixel line. Pixel lines L for the driver's seat (for display for the driver's seat) and pixel lines R for the passenger seat (for display for the passenger seat) are alternately provided in the direction substantially perpendicular to the data signal lines. In other words, to each pixel line, a drive voltage is applied (data is input) for image display for each display direction, and the order of these types of pixel lines is predetermined in accordance with the display directions. The interval (pixel pitch) between the neighboring pixel lines is preferably about 65 μm, for example.

The barrier section (barrier substrate) 20 is constituted by a barrier glass 21 and a barrier light shielding layer 22. The barrier glass 21 preferably is transparent glass and about 0.7 mm thick, for example. On the barrier glass 21, the barrier light shielding layer 22 is formed.

The barrier light shielding layer 22 is provided so that stripes are parallel or substantially parallel to the pixel lines R and L. A non-limiting example of the material of the barrier light shielding layer 22 is photosensitive resin in which a black pigment is dispersed. In the direction perpendicular to the pixel lines R and L, the width (barrier width) of the stripes of the barrier light shielding layer 22 preferably is about 40 μm, for example. The interval (barrier pitch) between the neighboring stripes of the barrier light shielding layer 22 preferably is about 129.99 μm, for example.

The stripes of the barrier light shielding layer 22 are arranged to correspond to the respective pixel lines of the display panel 10. In other words, the stripes of the barrier light shielding layer 22 are provided to prevent parts of light, which is emitted from the pixel lines of the display panel 10, from being observable in directions other than the display directions of the pixel lines. As a result, the pixel lines R for the driver's seat are viewable from the driver's seat but are not viewable from the passenger seat, whereas the pixel lines L for the passenger seat are viewable from the passenger seat but are not viewable from the driver's seat. In this manner, the display apparatus 1 can display different images for the driver's seat and the passenger seat, respectively.

To properly display images for the driver's seat and the passenger seat, it is necessary to precisely align the barrier section 20 with the display panel 10. It is therefore preferable to perform precise alignment by providing alignment marks on the respective members.

The adhesive layer 61 is used for adhering the barrier section 20 to the display panel 10. The adhesive layer 61 is formed on the entirety of the opposing surfaces of the barrier section 20 and the display panel 10. In short, the barrier section 20 and the display panel 10 are entirely adhered to each other. An example of the adhesive layer 61 is an ultraviolet-curing adhesive. In the display apparatus 1, the thickness of the adhesive layer 61 (i.e. the gap between the barrier glass 21 and the CF substrate 12) preferably is about 40 μm, for example.

The TN liquid crystal section 50 is constituted by opposing transparent substrates 51 and 52 and a liquid crystal layer 53 sandwiched therebetween.

The liquid crystal layer (nematic liquid crystal layer, TN cell) 53 is made of nematic liquid crystal. The thickness (cell thickness) of the liquid crystal layer 53 preferably is about 5 μm, for example.

Each of the transparent substrates (transparent electrode substrates) 51 and 52 preferably is about 0.4 mm thick, for example. On the opposing surfaces of the transparent substrates 51 and 52, electrodes (transparent electrodes) 54 and 55 are formed, respectively. A TN liquid crystal drive section 96 (described with reference to FIG. 17 below) applies a voltage (drive voltage) to the gap between the electrodes 54 and 55 so that an electric field spreading along the normal of the substrate surface is applied to the liquid crystal layer 53. The electrodes 54 and 55 do not require any particular patterning. These electrodes may be flat (common) electrodes evenly formed on the substrate surfaces.

On the opposing surfaces of the transparent substrates 51 and 52, orientation films 56 and 57 having been subjected to rubbing (orientation) in order to orient the liquid crystal molecules of the liquid crystal layer 53 are formed in such a manner as to cover the electrodes 54 and 55. On the surfaces opposite to the opposing surfaces of the transparent substrates 51 and 52, polarizing plates 42 and 43 are formed, respectively.

Figure 3:
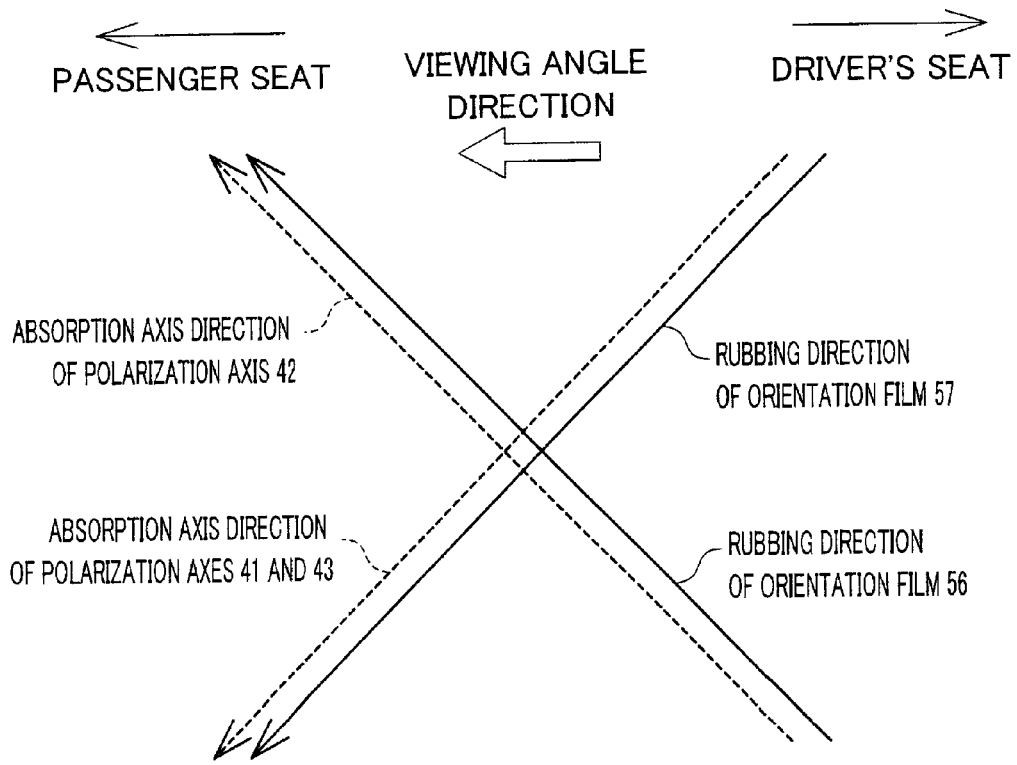
FIG. 3 illustrates the rubbing direction of an orientation film of a barrier liquid crystal panel of the display apparatus of a preferred embodiment of the present invention.

FIG. 3 illustrates rubbing directions of the orientation films 56 and 57 and the absorption axis directions of the polarizing plates 41-43, when the display apparatus 1 is viewed from the upper surface (display surface) side. As shown in the figure, the rubbing direction (rubbing axis) of the orientation film 56 is arranged to be substantially perpendicular to (forms an angle of about 90°±50 with) the rubbing direction of the orientation film 57. Also, the rubbing direction of the orientation film 56 is rotated for about an angle of about −45° in a clockwise direction from the longitudinal axis of the display surface, whereas the rubbing direction of the orientation film 57 is rotated for about an angle of about 45° in a clockwise direction from the longitudinal axis of the display surface. The absorption axes of the polarizing plates 41 and 43 are substantially parallel to the rubbing direction of the orientation film 57, whereas the absorption axis of the polarizing plate 42 is substantially perpendicular to the rubbing direction of the orientation film 57. As a result, the viewing angle directions (visual characteristics) of the TN liquid crystal section 50 are arranged such that the driver's seat side is in the anti-viewing angle direction whereas the passenger seat side is in the viewing angle direction. In this specification, the viewing angle direction is a direction to which the transmittance increases and the anti-viewing angle direction is a direction to which the transmittance decreases, when the display surface is viewed in directions tilting for the same angles from the direction vertical to the display surface towards the directions substantially parallel to the display surface (e.g., towards the right and left sides).

The TN liquid crystal section 50 is a normally-white display element allowing light to pass through in all directions, when no voltage is applied to the gap between the electrodes 54 and 55.

The adhesive layer 62 adheres the TN liquid crystal section 50 to the barrier section 20. An arrangement of the adhesive layer 62 is not particularly limited. For example, the opposing surfaces of the TN liquid crystal section 50 and the barrier section 20 may be entirely adhered to one another by an adhesive, or only parts of the opposing surfaces may be adhered to one another. Alternatively, the peripheral portions of the opposing surfaces may be adhered (fixed) to one another by a frame-shaped two-sided tape.

The TN liquid crystal section 50 and the barrier section 20 may not be adhered (fixed by adhesion) to one another. For example, the TN liquid crystal section 50 may be supported by a member (mechanical member) such as an outer frame (module outer frame) of the display apparatus 1. In such a case, the adhesive layer 62 is unnecessary.

Figure 17:
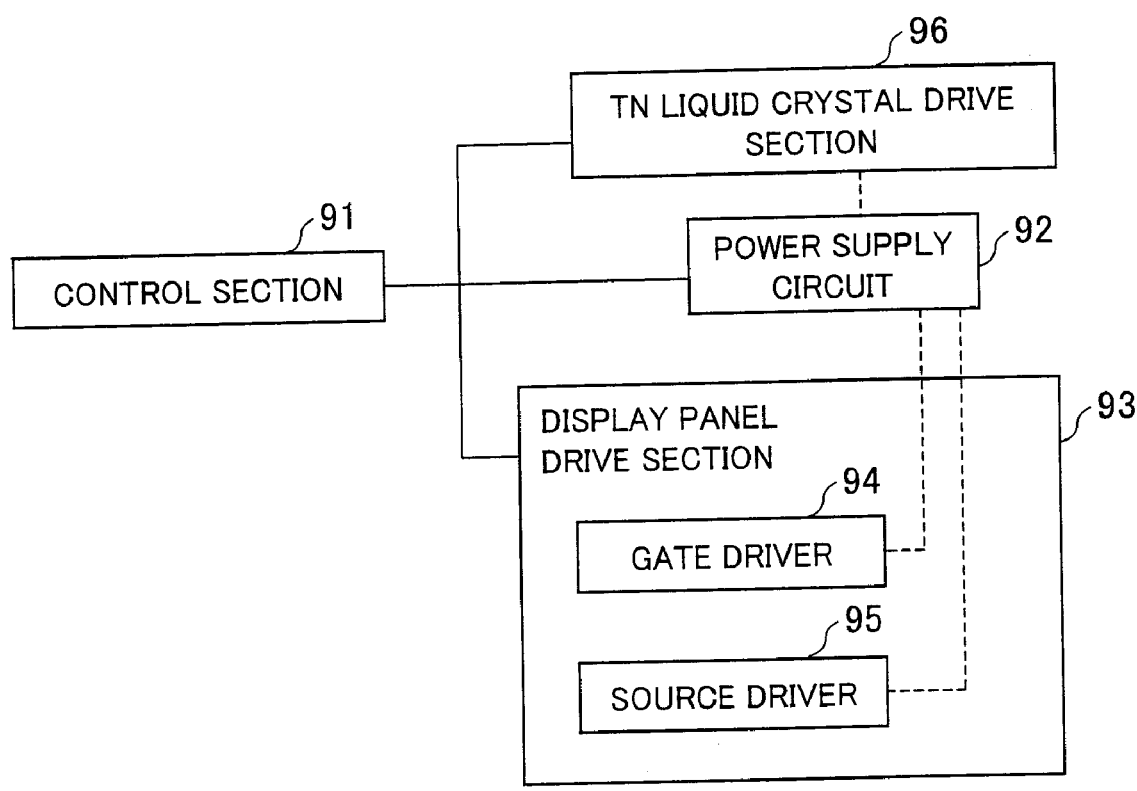
FIG. 17 is a block diagram outlining a display apparatus of a preferred embodiment of the present invention.

FIG. 17 is a block diagram outlining a control system of the display apparatus 1. As shown in the figure, the display apparatus 1 includes a control section 91, a power supply circuit 92, a display panel drive section 93, and a TN liquid crystal drive section 96.

The control section 91 centrally controls the sections of the display apparatus 1. The power supply circuit 92 supplies power to drive the display panel drive section 93 and the TN liquid crystal drive section 96, in response to an instruction from the control section 91.

The display panel drive section 93 includes the gate driver 94 and the source driver 95. As discussed above, the gate driver 94 is connected to the scanning signal lines, whereas the source driver 95 is connected to the data signal lines. The gate driver 94 and the source driver 95 control voltages applied to the scanning signal lines and the data signal lines, in response to instructions from the control section 91. As a result, the display panel 10 can display desired images in respective display directions, by changing the orientation of the liquid crystal molecules for the corresponding pixels.

The TN liquid crystal drive section 96 controls a voltage applied to the gap between the electrodes 54 and 55 of the TN liquid crystal section 50, in response to an instruction from the control section 91.

The following will describe the operation and display of the display apparatus 1, with reference to figures. First, in a case where different images are displayed for the driver's seat and the passenger seat (i.e., display for the driver's seat is not set to non-display) will be described. FIG. 4 illustrates the display in this case.

In a case where different images are displayed for the driver's seat (right side) and the passenger seat (left side), respectively, the control section 91 controls the TN liquid crystal driver section 96 so as not to apply a voltage to the gap between the electrodes 54 and 55 of the TN liquid crystal section 50. As discussed above, the TN liquid crystal section 50 in this case is normally-white. Therefore the light (image light) 70R having passed through the pixel line R for the driver's seat and the light (image light) 70L having passed through the pixel line L for the passenger seat are emitted in the respective display directions. In this case, scattered/diffracted light 80, which is generated because of scatter and diffraction of light at the end surface of the barrier light shielding layer 22, multiple reflections at the layers of the display apparatus, and the like, are also emitted from the display apparatus 1.

Next, the following will describe a case where the display apparatus 1 is arranged so that display for the driver's seat is set to non-display and an image is displayed only for the passenger seat. FIG. 5 illustrates the display in this case. As shown in the figure, in a case where display for the driver's seat is set to non-display, the display apparatus 1 is arranged so that the scattered/diffracted light 80 is blocked by the TN liquid crystal section 50.

Details of the functions of the TN liquid crystal section 50 will be given. In a case where display for the driver's seat is set to non-display, the control section 91 controls the TN liquid crystal section 96 so that a halftone voltage is applied to the gap between the electrodes 54 and 55 of the TN liquid crystal section 50. In this specification, the halftone voltage is a voltage with which the transmittance for the driver's seat (in the anti-viewing angle direction) is substantially zero (i.e., transmitted light is not recognized) whereas the transmittance for the passenger seat (in the viewing angle direction) is kept high (i.e., an image displayed for the passenger seat is suitably viewable). The voltage applied to the gap between the electrodes 54 and 55 in a case where display for the driver's seat is set to non-display is preferably a voltage which causes the difference between the transmittance for the driver's seat and the transmittance for the passenger seat to be maximized.

Figure 6:
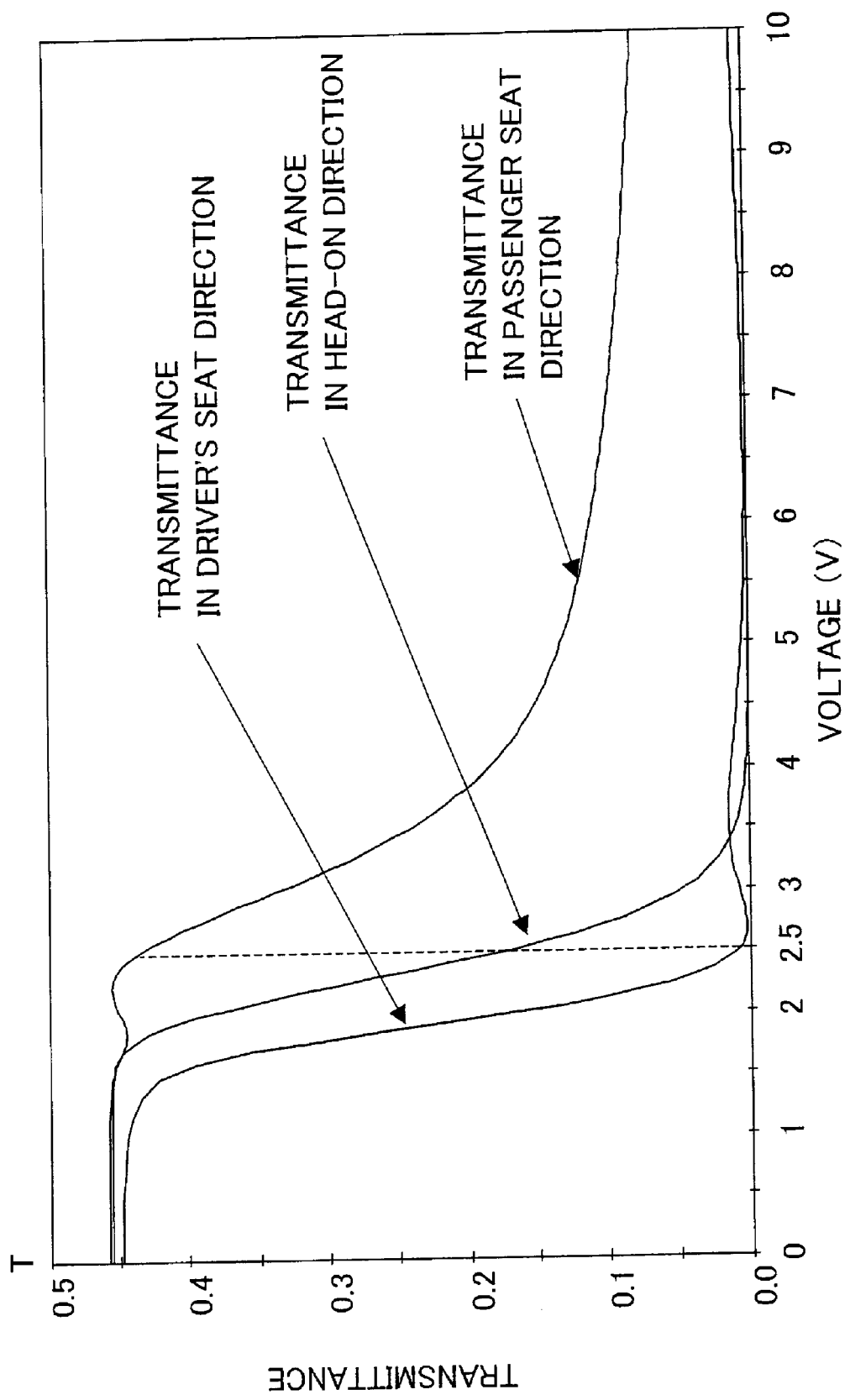
FIG. 6 is a graph showing the relationship between (i) a drive voltage applied to the barrier liquid crystal panel of the display apparatus of a preferred embodiment of the present invention, and (ii) transmittance in each display direction.

FIG. 6 is a graph showing the relationship between a voltage applied to the gap between the electrodes 54 and 55 and the transmittance in each display direction, in the TN liquid crystal section 50. In this graph, the direction towards the driver's seat is arranged to be about 30° to the right with respect to the display surface, whereas the direction towards the passenger seat is arranged to be about 30° to the left with respect to the display surface. The voltage applied to the gap between the electrodes has a rectangular wave. Also, the graph assumes that the cell retardation of the TN liquid crystal section 50 is set at about 400 nm (1stmin). The retardation is not particularly limited, and hence the same effects are achievable if the retardation is set at 2ndmin, for example. "1stmin" and "2ndmin" are cell retardation settings at which birefringence disappears and only optical rotation influences on the contrast.

As shown in the figure, as the voltage applied to the gap between the electrodes 54 and 55 is increased, the transmittance for the driver's seat is substantially null at the voltage of about 2.5V. In the meanwhile, the transmittance for the passenger seat at this voltage is substantially identical with the transmittance with no voltage application. It is also noted that the difference in the transmittance between for the driver's seat and for the passenger seat is maximized when the voltage applied to the gap between the electrodes is about 2.5V. For these reasons, the display apparatus 1 is arranged such that the voltage (halftone voltage) applied to the gap between the electrodes 54 and 55 is set at about 2.5V in a case where display for the driver's seat is set to non-display.

Figure 7A:
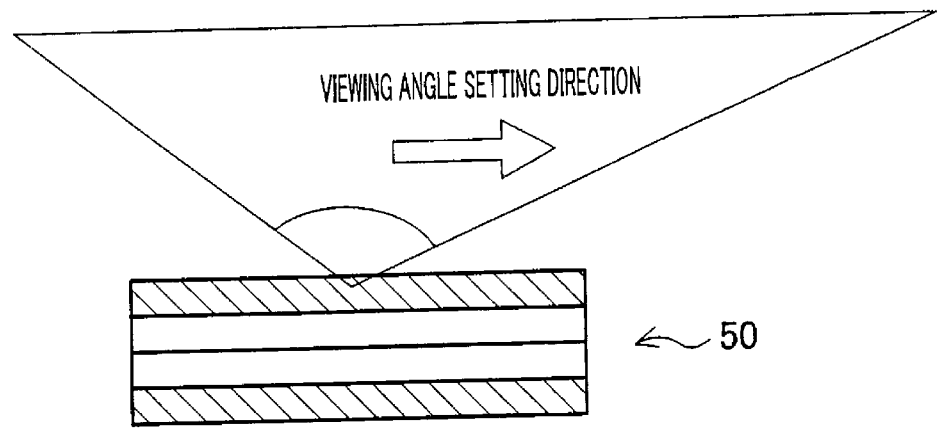
FIG. 7A shows the viewing angle characteristic of the barrier liquid crystal panel of the display apparatus according to a preferred embodiment of the present invention, in a case where the drive voltage of the barrier liquid crystal panel is turned off.
Figure 7B:
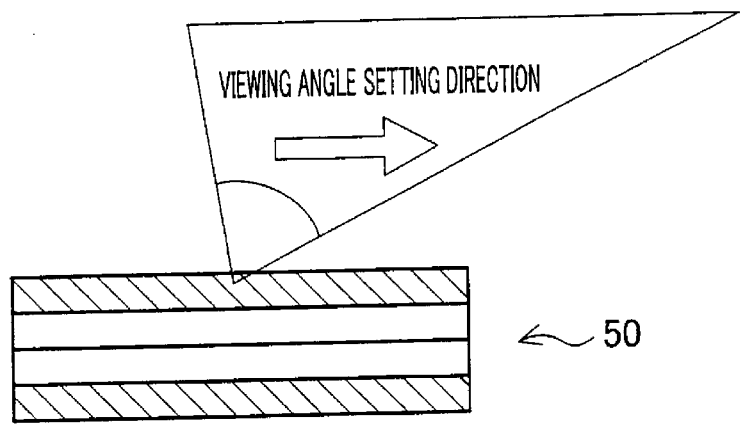
FIG. 7B shows the viewing angle characteristic of the barrier liquid crystal panel of the display apparatus according to a preferred embodiment of the present invention, in a case where the drive voltage of the barrier liquid crystal panel is set at halftone voltage.

FIG. 7A illustrates the viewing angle characteristic of the TN liquid crystal section 50 when no voltage is applied to the gap between the electrodes 54 and 55. FIG. 7B illustrates the viewing angle characteristic of the TN liquid crystal section 50 when the halftone voltage is applied to the gap between the electrodes 54 and 55.

When no voltage is applied to the gap between the electrodes 54 and 55 (i.e., in power-off state), display is performed in both the viewing angle direction (for the passenger seat; viewing angle setting direction) and the anti-viewing angle direction, as shown in FIG. 7A.

On the other hand, in a case where the halftone voltage is applied to the gap between the electrodes 54 and 55, the same display as the case of no voltage application is performed in the viewing angle direction (for the passenger seat), whereas no display is carried out in the anti-viewing angle direction (for the driver's seat), as shown in FIG. 7B.

Causing the TN liquid crystal section 50 to function as above, as shown in FIG. 5, the light (image light) 70L having passed through the pixel line L for the passenger seat is emitted towards the passenger seat whereas light including the scattered/diffracted light 80 is blocked so as not to be emitted towards the driver's seat. Therefore, as shown in FIG. 5, the same image as the case where display for the driver's seat is not set to non-display is displayed for the passenger seat, while no crosstalk to the driver's seat occurs. In other words, the resolution of an image for the driver's seat is improved and overlap of an image for the passenger seat onto black display is prevented.

As described above, the display apparatus 1 includes the normally-white TN liquid crystal section 50 in which the viewing angle direction is set so as to head to the passenger seat. In a case where display is carried out for both the driver's seat and the passenger seat, the drive voltage for the TN liquid crystal section 50 is switched off. In a case where display for the driver's seat is set to non-display and display is carried out only for the passenger seat, the halftone voltage is supplied as the drive voltage of the TN liquid crystal section 50.

With the arrangement above, in a case where display for the driver's seat is set to non-display, the TN liquid crystal section 50 blocks a component of the scattered/diffracted light 80, which is generated by scatter and diffraction of light at the end surface of the barrier light shielding layer 22, multiple reflections at the layers of the display apparatus, and the like, and heads to the driver's seat. It is therefore possible to prevent, when display for the driver's seat is set to non-display, crosstalk which occurs because an image for the passenger seat is leaked to the direction towards the driver's seat.

In other words, in the display apparatus 1, the parallax barrier (barrier section 20) is combined with TN liquid crystal (TN liquid crystal section 50) with high viewing angle dependency so that the separation capability (crosstalk prevention capability) of an image for the driver's seat is significantly improved. Therefore, the crosstalk prevention capability for the driver's seat is significantly improved and overlap of a displayed image for the passenger seat onto black display for the driver's seat is prevented.

As discussed above, while the vehicle is running, display for the driver's seat is not carried out and display is performed only for the passenger seat. That is to say, in the display apparatus 1, the control section 91 controls the sections and electrically changes the display, in such a manner as to cause the display apparatus to function as a DV display apparatus performing display for both the driver's seat and the passenger seat when the vehicle does not move, and cause the display apparatus to function as a single-view display apparatus performing display only for the passenger seat when the vehicle is running. As a result, it is possible to prevent the driver from losing attention to driving, so as to improve the safety.

Switching of display between the running state and non-running state (stop state) may be performed by the control section 91 in response to an instruction input from the user via an input device (not illustrated). Alternatively, the vehicle may be provided with a detector which detects whether the vehicle is running, and the switching may be performed by the control section 91 in consideration of the detection result. An example of the detector is a speed sensor of the vehicle.

In the display apparatus 1, display for the driver's seat is not performed and display is performed only for the passenger seat, when the vehicle is running. This arrangement, however, is not always appropriate. For example, a detector arranged to detect whether driving is possible may be provided and the control section 91 may switch the display in response to the detection result. Examples of such a detector include a gear shift position sensor and a sensor which detects the state of the parking brake.

The barrier liquid crystal panel in the display apparatus 1 is not necessarily the TN liquid crystal section 50. A display device which can be adopted in place of the TN liquid crystal section 50 is preferably arranged such that (i) the viewing angle direction heads to the passenger seat and the anti-viewing angle direction heads to the driver's seat, and (ii) it is possible to switch between the state where light can be transmitted towards both the driver's seat and the passenger seat and the state where the transmittance for the driver's seat is low whereas the transmittance for the passenger seat is kept high so as to allow the display for the passenger seat to be suitably viewable.

In the display apparatus 1, the display panel 10 preferably is a so-called vertical electric field liquid crystal display panel which applies an electric field along the normal of the surfaces of the TFT substrate 11 and the CF substrate 12. This arrangement, however, is not mandatory. For example, it is possible to adopt a so-called lateral electric field liquid crystal display panel which is arranged such that a comb-shaped electrode is provided on at least one of a pair of opposing substrates and liquid crystal molecules enclosed between the substrates are oriented by applying an electric field parallel or substantially parallel to the surfaces of the substrates.

The display panel 10 of the display apparatus 1 preferably is a liquid crystal display panel. The display panel 10, however, may be differently arranged. For example, as the display panel 10, it is possible to adopt an organic EL (Electro Luminescence) panel, a plasma display panel, a CRT (Cathode Ray Tube), or the like.

Although the display apparatus 1 of the present preferred embodiment preferably is an in-vehicle display apparatus, the use of the display apparatus is not limited to this. For example, the display apparatus 1 may be broadly adopted to television receivers, monitors, OA (Office Automation) equipments such as word processors and personal computers, video cameras, digital cameras, information terminals such as mobile phones, or the like. Moreover, since different images can be displayed for two directions, the display apparatus 1 may be suitably used for competitive games.

The sizes of the sections of the display apparatus 1 are specified in the present preferred embodiment. The sizes, however, are not limited to the above, and may be suitably determined in consideration of the use of the display apparatus, for example.

In the present preferred embodiment, the direction to the driver's seat is preferably set at about 30° to the right with respect to the display surface and the direction toward the passenger seat is preferably set at about 30° to the left with respect to the display surface, as shown in FIG. 6. However, the angles of these directions with respect to the display surface are not limited to the above. The angles of the display directions with respect to the display surface may be suitably determined in consideration of the position of the display apparatus in the vehicle, the setting angle, or the like.

In the display apparatus 1, the pixel lines R (display area for the driver's seat) for the driver's seat and the pixel lines L (display area for the passenger seat) for the passenger seat are alternately disposed. However, the display areas for the respective directions may be differently arranged. For example, the display areas may be arranged in units of pixels, or in units of sub-pixels in the color filter layer provided on the color filter substrate 12. In these cases, the barrier shielding layer 22 is provided in consideration of the display direction of each pixel or sub-pixel.

The display apparatus 1 is arranged so that different images are displayed in the driver's seat direction and the passenger seat direction, respectively. Alternatively, different images may be displayed in three or more directions, respectively. In this case, the TN liquid crystal section 50 is arranged to prevent light from being emitted in a display direction to which non-display is desired, including scattered/diffracted light.

The present preferred embodiment may be rephrased as follows: a TN panel (TN liquid crystal section 50) in which the viewing angle direction heads to the passenger seat whereas the anti-viewing angle heads to the driver's seat is provided on the front surface (display surface side) of a parallax barrier image separation display (DV display apparatus) so that the crosstalk prevention capability is improved in the driver's seat direction by the outgoing light characteristic of the viewing angle characteristic of the TN panel in addition to the image separation capability of the parallax barrier.

In the present preferred embodiment, the TN liquid crystal section 50 preferably is provided on the front surface (display surface side) of the DV display apparatus. Alternatively, the TN liquid crystal section 50 may be provided on the back surface (on the opposite side to the display surface) of the DV display apparatus.

Second Preferred Embodiment

The following will describe another preferred embodiment of the present invention. Members having the same functions as those described in the first preferred embodiment are given the same numbers, so that the descriptions are omitted for the sake of convenience.

The present preferred embodiment deals with a display apparatus 2 which preferably is substantially identical with the display apparatus 1 described in the first preferred embodiment except that the liquid crystal molecules of the display panel (main display panel) 10 are oriented in accordance with the display directions of the respective pixel lines. Although the display apparatus 2 is encompassed in the scope of the display apparatus 1 described in the first preferred embodiment, a different number is assigned to the display apparatus 2 for the sake of convenience.

Figure 8:
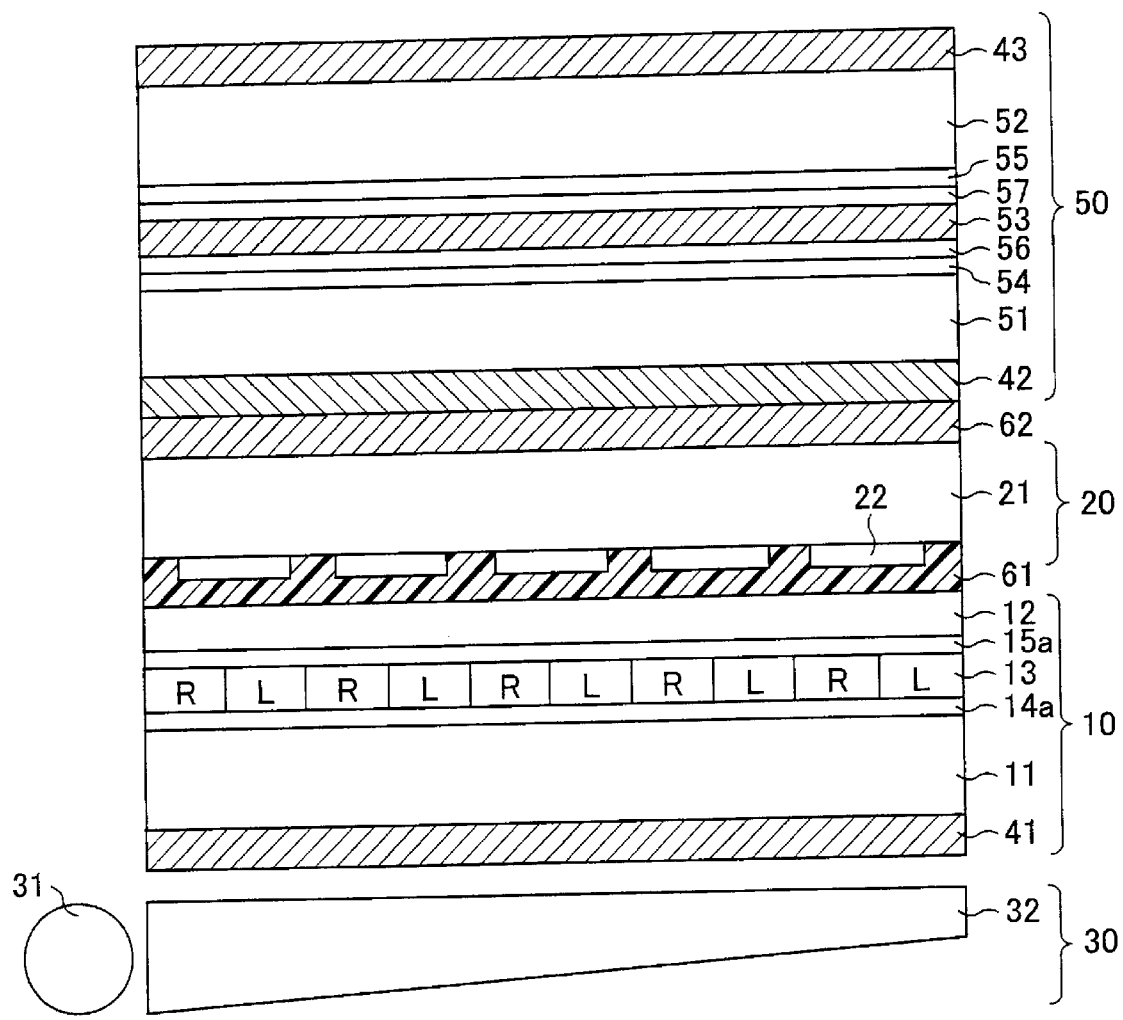
FIG. 8 is a cross section outlining a display apparatus of another preferred embodiment of the present invention.

FIG. 8 is a cross section outlining the display apparatus 2 of the present preferred embodiment. As shown in the figure, the display apparatus 2 of the present preferred embodiment is identical with the display apparatus 1 of the first preferred embodiment, except that the rubbing directions (orientations) of the orientation films 14a and 15a of the display panel 10 are arranged so as to be different in accordance with the display directions of the respective pixel lines.

Figure 9A:
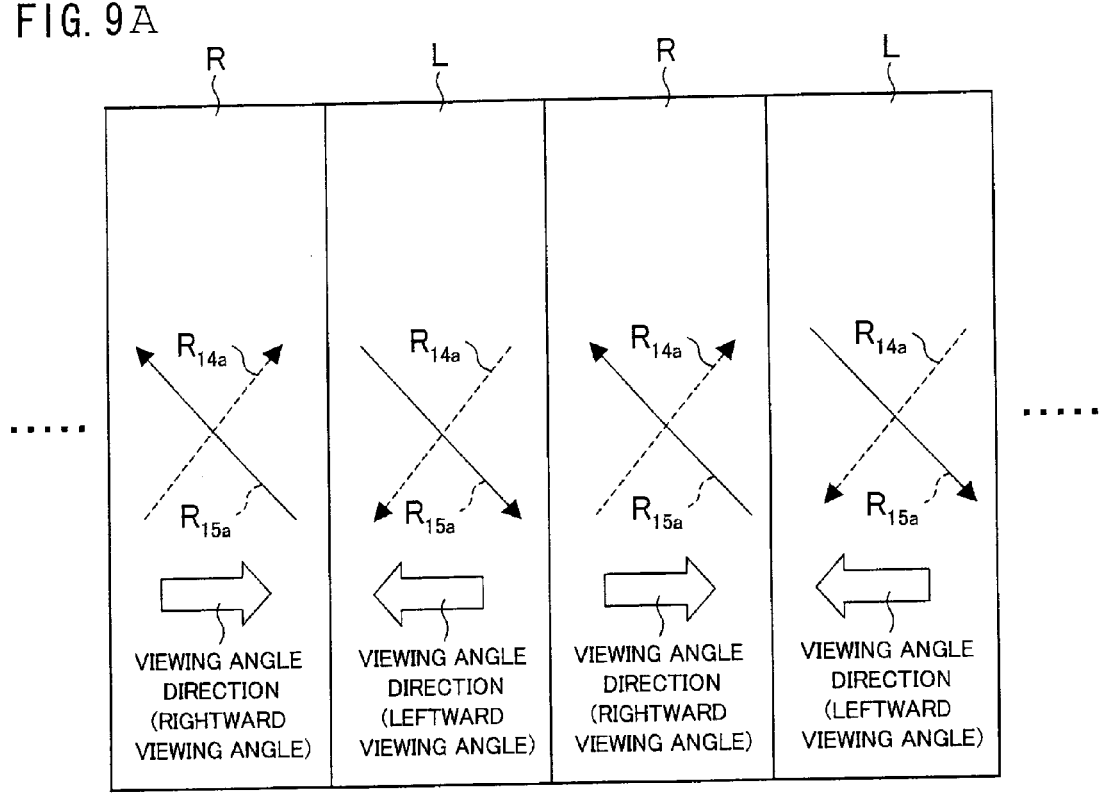
FIG. 9A schematically illustrates an example of the rubbing direction of an orientation film of a main liquid crystal display panel of the display apparatus of another preferred embodiment of the present invention.

FIG. 9A schematically illustrates the rubbing directions of the orientation films 14a and 15a when the display panel 10 is viewed from the display surface side (TN liquid crystal layer 50 side). In the figure, the rubbing directions correspond to the respective pixel lines, and a rubbing direction (rubbing axis) of the orientation film 14a is indicated as R14a whereas a rubbing direction of the orientation film 15a is indicated as R15a.

As shown in the figure, the rubbing direction of the orientation film 14a is substantially perpendicular to the rubbing direction of the orientation film 15a. Also, the orientations of the orientation films are arranged so that the viewing angles (visual characteristics) of neighboring pixel lines are opposite to one another. In other words, the pixel lines R for the right side sight and the pixel lines L for the left side sight are alternately provided, i.e., the pixel lines R in which the viewing angle direction heads to the right side (driver's seat side) and the pixel lines L in which the viewing angle direction heads to the left side (passenger seat side) are alternately provided. The rubbing direction of the orientation film 14a is rotated for about 45° with respect to the viewing angle direction of each pixel line, whereas the rubbing direction of the orientation film 15a is rotated for about 135° with respect to the viewing angle direction of each pixel line. As such, the orientation films formed on the TFT substrate 11 and the CF substrate 12 are divided into the TN orientation for the right viewing angle direction and the TN orientation for the left viewing angle direction, in accordance with the pixel lines (areas) which display images for the driver's seat (right side) and the passenger seat (left side), respectively.

Figure 9B:
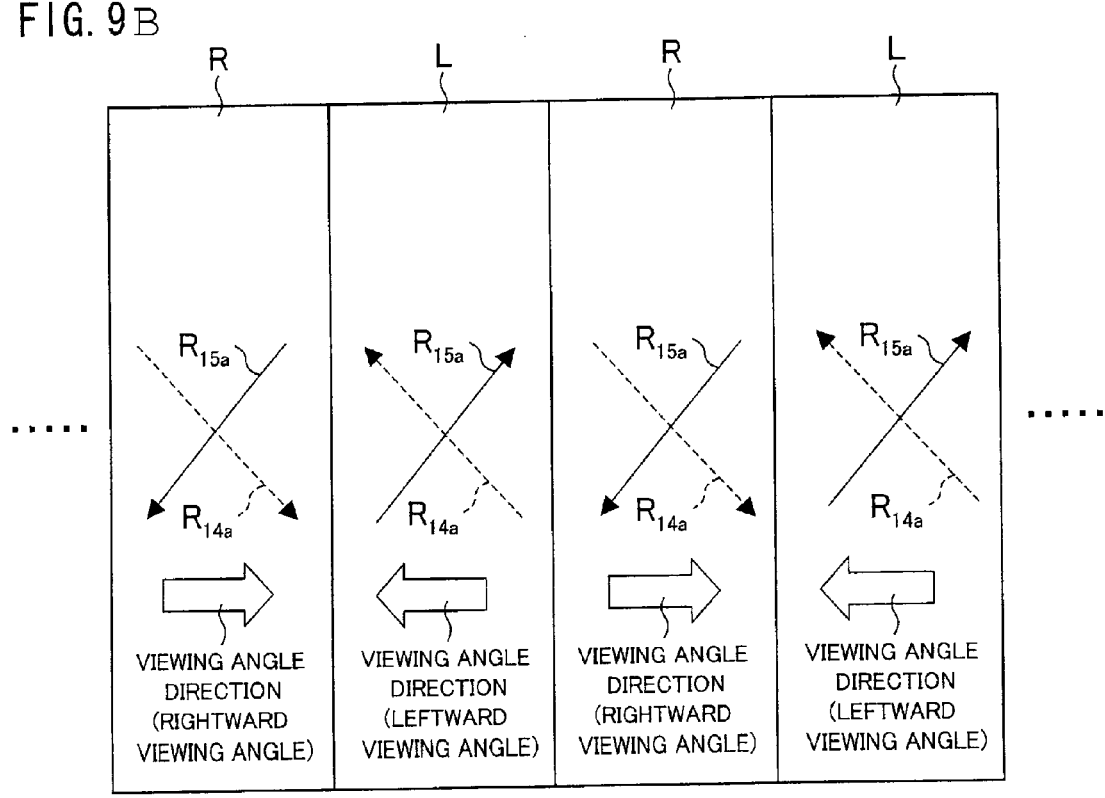
FIG. 9B schematically illustrates another example of the rubbing direction of the orientation film of the main liquid crystal display panel of the display apparatus of another preferred embodiment of the present invention.

The rubbing directions of the orientation films 14a and 15a are not limited to those shown in FIG. 9A. For example, as shown in FIG. 9B, rubbing may be performed onto the orientation films 14a and 15a in such a manner that the liquid crystal molecules between the substrates are oriented in the opposite directions to those of FIG. 9A.

That is to say, in a case where the rubbing in the directions shown in FIG. 9A is performed, the liquid crystal molecules between the orientation films 14a and 15a are oriented in a counter-clockwise direction from the orientation film 14a side to the orientation film 15a side (left-handed rotation), in response to an electric field applied to the gap between the substrates. On the other hand, as shown in FIG. 9B, in a case where the rubbing direction of the orientation film 14a is rotated for about 45° with respect to the viewing angle of each pixel line whereas the rubbing direction of the orientation film 15a is rotated for about −135° with respect to the viewing angle direction of each pixel line, the liquid crystal molecules between the orientation films 14a and 15a are oriented in a clockwise direction from the orientation film 14a side to the orientation film 15a side (right-handed rotation), in response to an electric field applied to the gap between the substrates. Also in this case, the viewing angle direction of the pixel line R corresponds to the right side sight and the viewing angle direction of the pixel line L corresponds to the left side sight, as in the case of FIG. 9A.

The following will describe how the rubbing is performed onto the orientation films 14a and 15a. FIGS. 10A-10E illustrate a rubbing step with respect to the orientation film 15a. Although the following deals with the rubbing with respect to the orientation film 15a, the same method can be performed for the orientation film 14a, too.

FIG. 10A shows a part of the orientation film 14a before the rubbing (un-rubbed orientation film). On the entire surface of the orientation film 14a in this state, as shown in FIG. 10B, rubbing in one direction (i.e., rubbing direction corresponding to any one of the pixel lines) is performed (entire rubbing of the whole surface). In this case, rubbing in the rubbing direction corresponding to the pixel line L is carried out for the all areas (both of the area corresponding to the pixel line L and the area corresponding to the pixel line R) at once.

Next, as indicated in FIG. 10C, the area corresponding to the pixel line R is masked by resist.

Subsequently, as shown in FIG. 10D, rubbing in the direction different from the rubbing in FIG. 10B is performed with respect to the areas corresponding to the pixel line L (rubbing for non-resist area). In the example shown in the figure, the rubbing is carried out in the direction antiparallel to the rubbing direction with respect to pixel line R, i.e. in the direction of rubbing performed in FIG. 10B.

Thereafter, the resist formed on the area corresponding to the pixel line R is removed. As a result, the areas, of the orientation film 14a, which correspond to the respective pixel lines are rubbed in accordance with the display directions (viewing angle directions) of the respective pixel lines.

Then images displayed by the display apparatus 2 will be discussed. It is noted that control performed by the control section 91 and functions of the TN liquid crystal section 50 are identical with those described in the first preferred embodiment.

First, in a case where different images are displayed for the driver's seat and the passenger seat (i.e., in a case where display for the driver's seat is not set to non-display) will be discussed. FIG. 11 shows the display in this case. It is noted that the TN liquid crystal section 50 is omitted from FIG. 11.

As discussed above, the display apparatus 2 is arranged such that an oriented area (TN oriented area) having the viewing angle direction toward the driver's seat (right side) is formed at the pixel area corresponding to the pixel line R by which display for the driver's seat is performed, whereas an oriented area having the viewing angle direction toward the passenger seat (left side) is formed at the pixel area corresponding to the pixel line L by which display for the passenger seat is performed. In other words, orientations are determined so that light from the pixel lines is easily emitted in the display directions (viewing angle directions) of the respective pixel lines but is hardly emitted in different display directions (anti-viewing angle directions).

With the arrangement above, the separation capability of image light entering the TN liquid crystal section 50 through the barrier section 20 is significantly improved. To put it differently, in the display apparatus 2, the pixel areas are oriented so that the pixel areas for the left side function as display areas (TN areas) having the viewing angles for the left side whereas the pixel areas for the right side function as display areas (TN areas) having the viewing angles for the right side. As a result, the crosstalk prevention capability is significantly improved by the orientation division which prompts light to travel in desired directions, in addition to the image light separation capability of the barrier section 20.

Figure 12A:
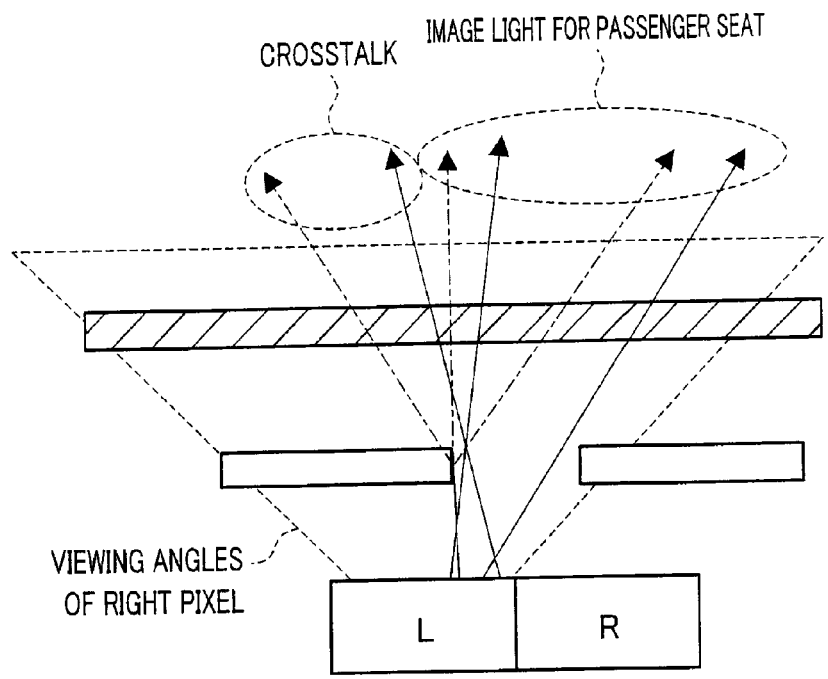
FIG. 12A illustrates the viewing angle characteristic in a case where a display panel without orientation division is adopted as the main liquid crystal panel.

Details of the point above will be given with reference to FIGS. 12A and 12B. FIG. 12A shows the viewing angles of the pixel line L for the left side (pixels for the left) in a case where the display panel 10 with no orientation division is adopted (i.e., for all pixel lines, the viewing angle direction is set to the vertical direction with respect to the surface of the figure (uniaxial setting).

In the display panel with such a viewing angle direction, as shown in FIG. 12A, the viewing angle characteristics are substantially equal in both the right side and left side (driver's seat side and the passenger seat side). For this reason, image light is emitted from the pixels (pixel lines) substantially equally in all display directions (both for the driver's seat and the passenger seat). Then, as shown in FIG. 12A, among the image light emitted from the pixel lines L for the passenger seat, for example, image light heading to the driver's seat is blocked by the barrier light shielding layer 22 so that separation of image light is achieved. As such, light separated only by the separation capability of the barrier section 20 enters the TN liquid crystal section 50.

In other words, since the areas corresponding to the respective pixels for the driver's seat and the passenger seat have substantially bilaterally symmetrical viewing angles, the pixel lines L for the left side, which provide desired image light to the passenger seat, equally emit light to the driver's seat as well as the passenger seat. In this case, even if separation of image light is possible via the barrier section 20, a part of image light for the left side enters the TN liquid crystal section 50 as light heading to the driver's seat, on account of reasons such as scattering and diffraction of light at the end surface of the barrier light shielding layer 22.

In the TN liquid crystal section 50, the drive voltage is switched off when display for the driver's seat is not set to non-display. For this reason, light having passed through the barrier section 20 or light scattered or diffracted at the barrier section 20 passes through the TN liquid crystal section 50 and is emitted without changing its traveling direction. A part of the image light for the passenger seat is therefore leaked toward the driver's seat, and hence crosstalk occurs. Crosstalk similarly occurs in the passenger seat direction, too. Therefore, crosstalk may be conspicuous and visibility may be decreased in some display patterns.

Figure 12B:
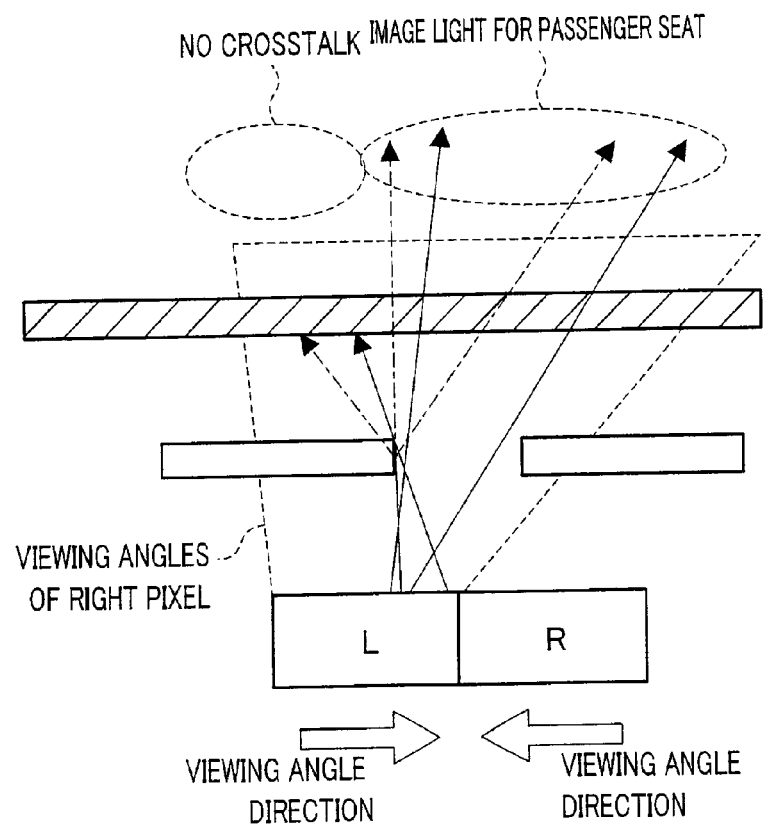
FIG. 12B illustrates the viewing angle characteristic of the main liquid crystal panel (with orientation division) of the display apparatus of another preferred embodiment of the present invention.
Figure 14:
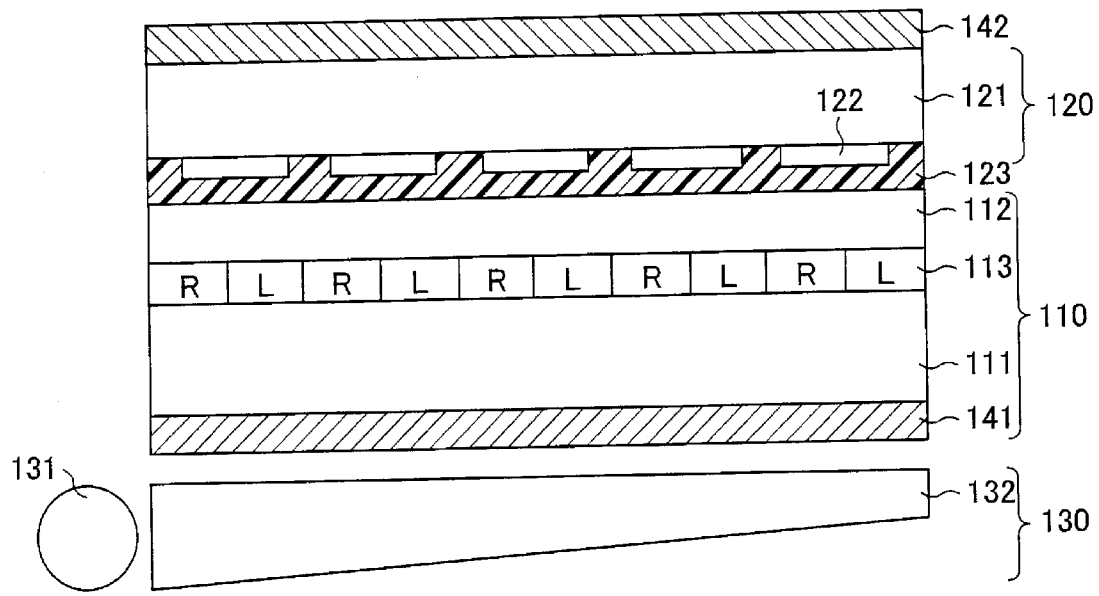
FIG. 14 is a schematic cross section showing an arrangement of a conventional DV display apparatus.

In the meanwhile, FIG. 12B shows the viewing angles of the pixel lines L for the left side (pixels for the left) of the display apparatus 2, i.e., the viewing angles of the pixel lines L for the left side, in the display panel 10 with orientation division.

In the display apparatus 2, the areas corresponding to the pixels for the right and the pixels for the left are oriented so as to correspond to the right viewing angles and the left viewing angles, respectively. On this account, for example, light emitted from the pixel lines L for the left side preferentially heads to the passenger seat, on account of the viewing angle characteristic thereof. Furthermore, since the traveling direction of scattered/diffracted light which causes crosstalk is parallel or substantially parallel to the anti-viewing angle direction, the scattered/diffracted light hardly heads to the TN liquid crystal section 50, and hence unnecessary light leakage is small. It is therefore possible to suitably display images with reduced crosstalk, for both the driver's seat and the passenger seat.

The following will describe display on the display apparatus 2 in a case where display for the driver's seat is set to non-display. FIG. 13 illustrates display on the display apparatus 2 in this case. It is noted that the TB liquid crystal section 50 is omitted from FIG. 13.

As shown in the figure, in a case where display for the driver's seat is set to non-display in the display apparatus 2, scattered/diffracted light included in light entering the TN liquid crystal section 50 is reduced by orientation division performed onto the display panel 10, as in the case shown in FIG. 12B. Furthermore, even if scattered/diffracted light enters the TN liquid crystal section 50, the TN liquid crystal section 50 blocks the scattered/diffracted light heading to the driver's seat, as discussed in the first preferred embodiment. As a result, in the display apparatus 2, it is possible to effectively prevent image light for the passenger seat from leaking to the driver's seat side on account of crosstalk, in the case where display for the driver's seat is set to non-display. Furthermore, since crosstalk is reduced also for the passenger seat, the quality of display for the passenger seat is improved, too.

As described above, in the display apparatus 2, orientations of the pixels (pixel lines) for displaying images for the driver's seat and the passenger seat, respectively, are determined (orientation division is performed) in accordance with the display directions. In other words, in accordance with the pixels (pixel areas) for display in the right side and display in the left side in the display panel 10, orientation division is performed for the pixels so that an oriented area (TN area) with the viewing angles towards the left side is formed for the pixel area for the left whereas an oriented area (TN area) with the viewing angles towards the right side is formed for the pixel area for the right. As a result, the pixels have viewing angle directions (viewing angle characteristics) in accordance with the display directions. Light from the pixels therefore has outgoing light characteristics such that light is easily emitted in the display directions of the pixels, but are not easily emitted in other display directions.

With this, crosstalk is reduced on account of orientation division by which light is prompted to travel in desired directions, in addition to the separation capability of image light by the barrier section 20 (parallax barrier). In other words, in addition to the parallax barrier, orientation division is performed for the display panel 10 (main LCD) so that respective areas acquire desired viewing angle directions, and hence the separation capability of images is significantly improved for both the driver's seat and the passenger seat.

Therefore, in a case where different images are displayed for the driver's seat and the passenger seat (display for the driver's seat is not set to non-display), images with reduced crosstalk are suitably displayed for both the driver's seat and the passenger seat. In other words, the crosstalk prevention capability is significantly improved both for the driver's seat and the passenger seat, and hence the viewability is improved.

Furthermore, also in a case where display for the driver's seat is set to non-display and an image is displayed only for the passenger seat, scattered/diffracted light entering the TN liquid crystal section 50 is reduced by orientation division. In addition, among the scattered/diffracted light entering the TN liquid crystal section 50, a component heading to the driver's seat is blocked by the TN liquid crystal section 50. It is therefore possible to further effectively prevent image light for the passenger seat from leaking to the driver's seat side which is set to non-display or black display. The safety of driving is improved by, for example, setting display for the driver's seat to non-display while the vehicle is running.

In the present preferred embodiment, the rubbing directions of the areas in the orientation films 14*a* and 15*a* are arranged as shown in FIGS. 9A and 9B. Not being limited to this, the viewing angle directions (viewing angle characteristics) of the respective areas may be arranged so as to correspond to the display directions of the areas.

As described above, a display apparatus according to a preferred embodiment of the present invention preferably includes a display device in which plural pixels for displaying images in predetermined directions are disposed in a predetermined order in accordance with directions of displaying the images; and a light shielding member arranged to prevent light emitted from the pixels from being viewed in directions other than display directions of the pixels, the display apparatus displaying different images in plural display directions, respectively, the display apparatus further including a barrier liquid crystal panel which is arranged to (i) let the light emitted from the pixels and having passed through the light shielding member to pass through in the display directions, when a drive voltage is not applied, and (ii) decrease transmittance in a particular display direction, when the drive voltage is applied.

According to the arrangement above, light emitted from the barrier liquid crystal panel in the particular direction is reduced by applying a drive voltage to the barrier liquid crystal panel. As a result, in a case where display in the particular direction is set to non-display, it is possible to reduce a component of light generated by scattering and diffraction at the light shielding member, the component traveling in the non-display direction. This makes it possible to prevent crosstalk which occurs in such a manner that image light in other display directions leaks to the non-display direction, and hence the image separation capability in the non-display direction is improved.

The barrier liquid crystal panel may include a pair of substrates opposing each other; a liquid crystal layer sandwiched between the pair of substrates; an electrode arranged to apply an electric field to the liquid crystal layer; and an orientation member arranged to orient liquid crystal molecules in the liquid crystal layer in such a way as to decrease the transmittance in the particular direction, when the driver voltage is applied to the electrode.

According to this arrangement, when the orientation member applies the electric field to the liquid crystal layer by applying the drive voltage to the electrode, the liquid crystal molecules in the liquid crystal layer are oriented so that the transmittance in the particular direction is decreased. With this, when display in the particular direction is set to non-display, it is possible to reduce a component of light due to scattering and diffraction at the light shielding member, the component traveling in the non-display direction. This makes it possible to prevent or reduce crosstalk which occurs in such a manner that image light in other display directions leaks to the non-display direction, and hence the image separation capability in the non-display direction is improved.

It may be arranged so that the liquid crystal layer is made of nematic liquid crystal, the electrode is provided on the liquid crystal layer in such a way as to apply the electric field along a direction normal to surfaces of the pair of substrates, the orientation member includes orientation films which are provided on opposing surfaces of the pair of substrates and are oriented in directions substantially perpendicular to each other, and the orientation films are disposed so that the particular display direction is set at an anti-viewing angle direction.

That is to say, the barrier liquid crystal panel may be a so-called TN (Twisted Nematic) liquid crystal panel, and the particular direction may be set at the anti-viewing angle direction. In this specification, the viewing angle direction is a direction to which the transmittance increases and the anti-viewing angle direction is a direction to which the transmittance decreases, when the display surface is viewed in directions tilting for the same angles from the direction vertical to the display surface towards the directions parallel or substantially parallel to the display surface.

It has been known that, in TN liquid crystal panels, viewing angle characteristics when an electric field is applied to a liquid crystal layer are different between directions of viewing the display surface. For example, the transmittance is different between (i) in a case where the display surface is viewed at an angle (e.g., about 30°) to the right of the direction vertical to the display surface, and (ii) in a case where the display surface is viewed at the same angle (e.g., about 30°) to the left of the direction vertical to the display surface.

According to the arrangement above, a TN liquid crystal panel is used and an orientation member is arranged so that the non-display direction is set at the anti-viewing angle direction. With this, light having been emitted from the pixels and passed through the light shielding member is transmitted to the display directions, when the drive voltage is not applied, whereas the transmittance in the particular display direction is decreased when the drive voltage is applied.

The drive voltage may be a halftone voltage. In this specification, the halftone voltage is a voltage that orients the liquid crystal molecules of the liquid crystal layer in such a manner that the transmittance in the anti-viewing angle direction is reduced so that transmitted light is not recognized, whereas the transmittance in the viewing angle direction is kept high so that an image displayed in this direction is suitably viewable.

According to this arrangement, in a case where display in the particular direction is set to non-display, it is possible to further effectively reduce a component of light due to scattering and diffraction at the light shielding member, the component traveling in the non-display direction, and cause image light for the other display directions to travel to these directions, with high transmittance. It is therefore possible to suitably prevent crosstalk from occurring in the non-display direction, without reducing the quality of display in the other display directions.

It may be arranged so that the display device includes a pair of second substrates opposing each other; a second liquid crystal layer sandwiched between the pair of second substrates; a second orientation member arranged to orient liquid crystal molecules constituting the second liquid crystal layer; and a second electrode arranged to apply electric fields independently to areas of the second liquid crystal layer, the areas corresponding to the respective pixels, the second orientation member orienting the liquid crystal molecules in the areas corresponding to the pixels so as to cause the display directions of the pixels to be parallel or substantially parallel to the viewing angle direction.

According to the arrangement above, the pixels in the display device have viewing angle directions corresponding to the respective display directions of the pixels. In other words, areas of the second liquid crystal layer, the areas corresponding to the respective pixels, are subjected to orientation division so that the display directions of the pixels are set at the viewing angle directions. On this account, light emitted from the pixels can easily travel in the display directions of the pixels, but cannot easily travel in other display directions. As a result, crosstalk is reduced in all display directions on account of the orientation division which prompts light to travel in desired directions, in addition to the separation capability of image light by the light shielding member. In short, the display quality is improved in all display directions and hence the visibility is improved.

Furthermore, in a case where display in the particular display direction is set to non-display, it is possible to reduce a component traveling in the particular display direction, among scattered/diffracted light of image light in other display directions, entering the barrier liquid crystal panel. A component traveling in the particular display direction among scattered/diffracted light having entered the barrier liquid crystal panel is blocked by the barrier liquid crystal panel. It is therefore possible to further effectively prevent crosstalk of image light from the other directions to the particular display direction.

It may be arranged so that the display apparatus according to a preferred embodiment of the present invention is an in-vehicle display apparatus displaying different images in respective display directions including a driver's seat direction, the driver's seat direction being set at the particular direction.

According to the arrangement above, in a case where display for the driver's seat is set to non-display, the drive voltage is applied to the barrier liquid crystal panel so that a component traveling in the driver's seat direction, among scattered/diffracted light generated at the light shielding member, is reduced. In other words, it is possible to prevent crosstalk which occurs due to leakage of image light in the other display directions to the driver's seat direction. Therefore, for example, display for the driver's seat is set to non-display while the vehicle is running or the driver is driving the vehicle, so that image light in the other directions is prevented from being viewed in the driver's seat direction. As a result, it is possible to prevent the driver from losing attention to driving, so as to improve the safety.

The preferred embodiments and specific examples of implementation discussed in the foregoing detailed explanation serve solely to illustrate the technical details of the present invention, which should not be narrowly interpreted within the limits of such preferred embodiments and specific examples, but rather may be applied in many variations within the spirit of the present invention.

The display apparatus according to various preferred embodiments of the present invention may be broadly adopted as display apparatuses of moving apparatuses such as vehicles, television receivers, monitors, OA (Office Automation) equipments such as word processors and personal computers, video cameras, digital cameras, information terminals such as mobile phones, or the like. The display apparatus according to various preferred embodiments of the present invention is particularly suitable for in-vehicle displays, because, when display for one direction is set to non-display and display is performed only for the other direction, it is possible to prevent the image for the other direction from being displayed for the non-display direction due to crosstalk.

While preferred embodiments of the present invention have been described above, it is to be understood that variations and modifications cope and spirit of the present invention. The scope of the present invention, therefore, is to be determined solely by the following claims.

The invention claimed is:

1. A display apparatus for displaying different images in plural display directions, the display apparatus comprising:
 a display device in which plural pixels arranged to display images in predetermined directions are disposed in a predetermined order in accordance with directions of displaying the images; and
 a light shielding member arranged to prevent light emitted from the pixels from being viewed in directions other than display directions of the pixels; and
 a barrier liquid crystal panel which is arranged to:
  (i) allow the light emitted from the pixels which has passed through the light shielding member to pass through in the plural display directions, when a drive voltage is not applied,
  (ii) decrease a transmittance in at least one display direction out of the plural display directions, when the drive voltage is applied, and
  (iii) maintain a transmittance in all of the plural display directions except for the at least one display direction when the drive voltage is applied.

2. The display apparatus as defined in claim 1, wherein, the barrier liquid crystal panel includes:
 a pair of substrates opposing each other;
 a liquid crystal layer sandwiched between the pair of substrates;
 an electrode arranged to apply an electric field to the liquid crystal layer; and
 an orientation member arranged to orient liquid crystal molecules in the liquid crystal layer so as to decrease the transmittance in the particular direction, when the driver voltage is applied to the electrode.

3. The display apparatus as defined in claim 2, wherein the liquid crystal layer is made of nematic liquid crystal, the electrode is arranged on the liquid crystal layer so as to apply the electric field along a direction that is normal to surfaces of the pair of substrates, the orientation member includes orientation films which are provided on opposing surfaces of the pair of substrates and are oriented in directions substantially perpendicular to each other, and the orientation films are disposed so that the particular display direction is set at an anti-viewing angle direction.

4. The display apparatus as defined in claim 3, wherein the drive voltage is a halftone voltage.

5. The display apparatus as defined in claim 1, wherein, the display device includes:
 a pair of second substrates opposing each other;
 a second liquid crystal layer sandwiched between the pair of second substrates;
 a second orientation member arranged to orient liquid crystal molecules constituting the second liquid crystal layer; and a second electrode arranged to apply electric fields independently to areas of the second liquid crystal layer, the areas corresponding to the respective pixels; wherein, the second orientation member is arranged to orient the liquid crystal molecules in the areas corresponding to the pixels so as to cause the display directions of the pixels to be substantially parallel to the viewing angle direction.

6. The display apparatus as defined in claim 1, wherein the display apparatus is an in-vehicle display apparatus displaying different images in respective display directions including a driver's seat direction, the driver's seat direction being set at the particular direction.

* * * * *